US012249333B2

(12) United States Patent
Sanborn de Asis

(10) Patent No.: US 12,249,333 B2
(45) Date of Patent: *Mar. 11, 2025

(54) MULTI-DEVICE OUTPUT MANAGEMENT

(71) Applicant: Amazon Technologies, Inc., Seattle, WA (US)

(72) Inventor: Ezekiel Wade Sanborn de Asis, Santa Clara, CA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/627,846

(22) Filed: Apr. 5, 2024

(65) Prior Publication Data

US 2024/0257809 A1    Aug. 1, 2024

Related U.S. Application Data

(63) Continuation of application No. 18/347,171, filed on Jul. 5, 2023, now Pat. No. 12,002,469, which is a continuation of application No. 17/849,820, filed on Jun. 27, 2022, now Pat. No. 11,783,833, which is a continuation of application No. 16/834,874, filed on Mar. 30, 2020, now Pat. No. 11,393,471.

(51) Int. Cl.
*G10L 15/22*    (2006.01)
*G06F 3/16*     (2006.01)

(52) U.S. Cl.
CPC .............. *G10L 15/22* (2013.01); *G06F 3/165* (2013.01); *G10L 2015/223* (2013.01)

(58) Field of Classification Search
CPC ....... G10L 15/20; G10L 15/22; G10L 13/033; G10L 13/10; G10L 2015/223; G10L 15/1807; G06F 3/165
See application file for complete search history.

(56) References Cited

U.S. PATENT DOCUMENTS

| 4,831,550 | A  | * | 5/1989 | Katz ...................... G10L 15/14 704/240 |
| 6,725,194 | B1 | * | 4/2004 | Bartosik ............... G10L 15/075 704/235 |
| 8,275,621 | B2 | * | 9/2012 | Alewine ................. G10L 13/08 704/266 |
| 8,965,769 | B2 | * | 2/2015 | Mori ..................... G06F 40/117 704/260 |
| 9,047,868 | B1 | * | 6/2015 | O'Neill ................. G10L 15/197 |
| 9,966,066 | B1 | * | 5/2018 | Corfield ............... G10L 15/142 |

(Continued)

FOREIGN PATENT DOCUMENTS

WO    WO-2016002879 A1 *    1/2016    ........... G10L 13/027

*Primary Examiner* — Mohammad K Islam
(74) *Attorney, Agent, or Firm* — Pierce Atwood LLP

(57) ABSTRACT

A system is provided for modifying how an output is presented via a multi-device synchronous configuration based on detecting a speech characteristic in the user input. For example, if the user whispers a request, then the system may temporarily modify how the responsive output is presented to the user via multiple devices. In one example, the system may lower the volume on all devices presented the output. In another example, the system may present the output via a single device rather than multiple devices. The system may also determine to operate in an alternate output mode based on certain non-audio data.

20 Claims, 14 Drawing Sheets

(56) References Cited

U.S. PATENT DOCUMENTS

| | | | | |
|---|---|---|---|---|
| 10,127,908 B1* | 11/2018 | Deller | | H04L 67/306 |
| 10,140,973 B1* | 11/2018 | Dalmia | | G06N 7/01 |
| 10,192,552 B2* | 1/2019 | Raitio | | G10L 25/18 |
| 10,217,452 B2* | 2/2019 | Kayama | | G10L 25/90 |
| 10,276,149 B1* | 4/2019 | Liang | | G10L 13/033 |
| 10,319,250 B2* | 6/2019 | Lokeswarappa | | G09B 5/04 |
| 10,319,365 B1* | 6/2019 | Nicolis | | G10L 15/26 |
| 10,339,925 B1* | 7/2019 | Rastrow | | H04M 3/42382 |
| 10,388,272 B1* | 8/2019 | Thomson | | G10L 15/22 |
| 10,448,115 B1* | 10/2019 | Jamal | | G10L 15/1815 |
| 10,468,027 B1* | 11/2019 | Deller | | G10L 15/30 |
| 2005/0273337 A1* | 12/2005 | Erell | | G10L 15/07 |
| | | | | 704/260 |
| 2006/0085183 A1* | 4/2006 | Jain | | G10L 17/26 |
| | | | | 704/E15.044 |
| 2007/0162272 A1* | 7/2007 | Koshinaka | | G06F 16/35 |
| | | | | 707/E17.089 |
| 2011/0282643 A1* | 11/2011 | Chatterjee | | G06F 40/44 |
| | | | | 704/2 |
| 2011/0288861 A1* | 11/2011 | Kurzweil | | G09B 5/062 |
| | | | | 704/E15.044 |
| 2012/0117153 A1* | 5/2012 | Gunasekar | | G06Q 10/10 |
| | | | | 709/204 |
| 2015/0243181 A1* | 8/2015 | Somasundaran | | G09B 7/02 |
| | | | | 434/167 |
| 2016/0093287 A1* | 3/2016 | Bangalore | | G10L 13/033 |
| | | | | 704/260 |
| 2016/0379638 A1* | 12/2016 | Basye | | G10L 15/22 |
| | | | | 704/235 |
| 2017/0011344 A1* | 1/2017 | Choi | | H04L 51/046 |
| 2017/0116978 A1* | 4/2017 | Matsubara | | G10L 13/047 |
| 2017/0221470 A1* | 8/2017 | Kayama | | G10L 21/0364 |
| 2017/0358301 A1* | 12/2017 | Raitio | | G10L 25/18 |
| 2018/0053502 A1* | 2/2018 | Biadsy | | G10L 15/08 |
| 2018/0082679 A1* | 3/2018 | McCord | | G06N 3/04 |
| 2018/0122361 A1* | 5/2018 | Silveira Ocampo | | |
| | | | | G10L 13/0335 |
| 2018/0294001 A1* | 10/2018 | Kayama | | G10L 15/02 |
| 2019/0251964 A1* | 8/2019 | Dharne | | G06V 20/10 |
| 2020/0243062 A1* | 7/2020 | Scodary | | H04M 3/493 |
| 2021/0366462 A1* | 11/2021 | Yang | | G06F 40/30 |
| 2021/0405962 A1* | 12/2021 | Mackay | | H04N 21/8547 |

* cited by examiner

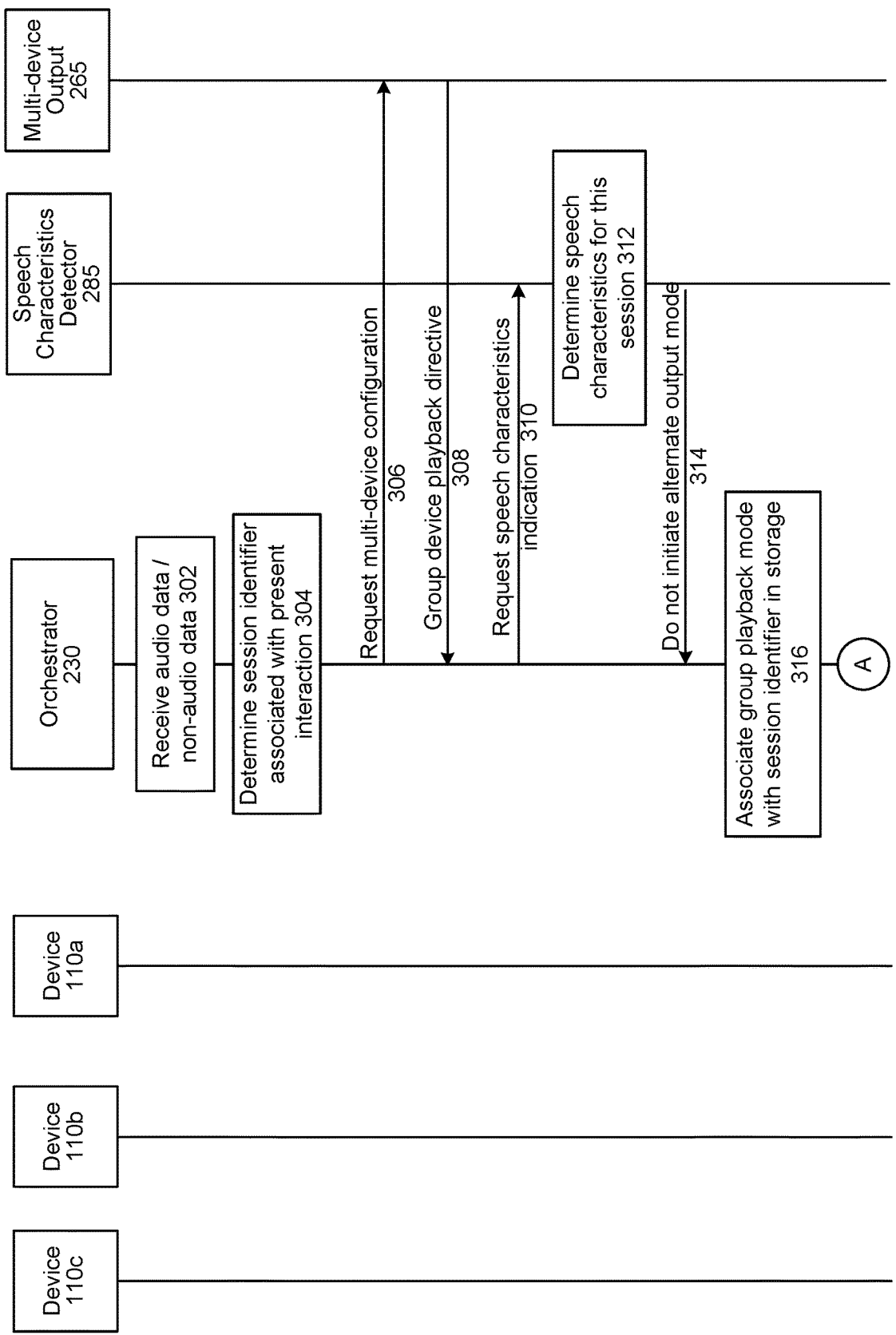

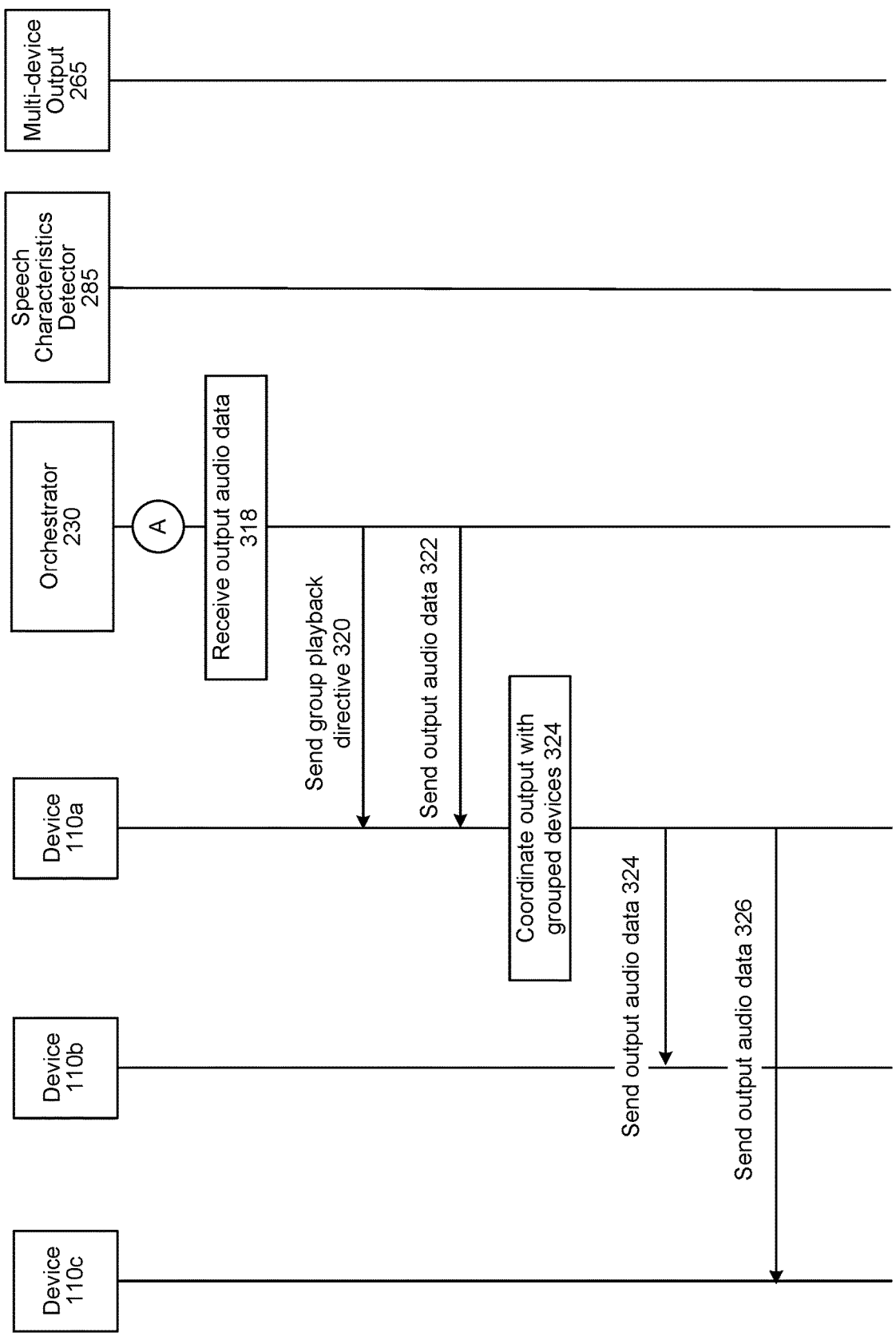

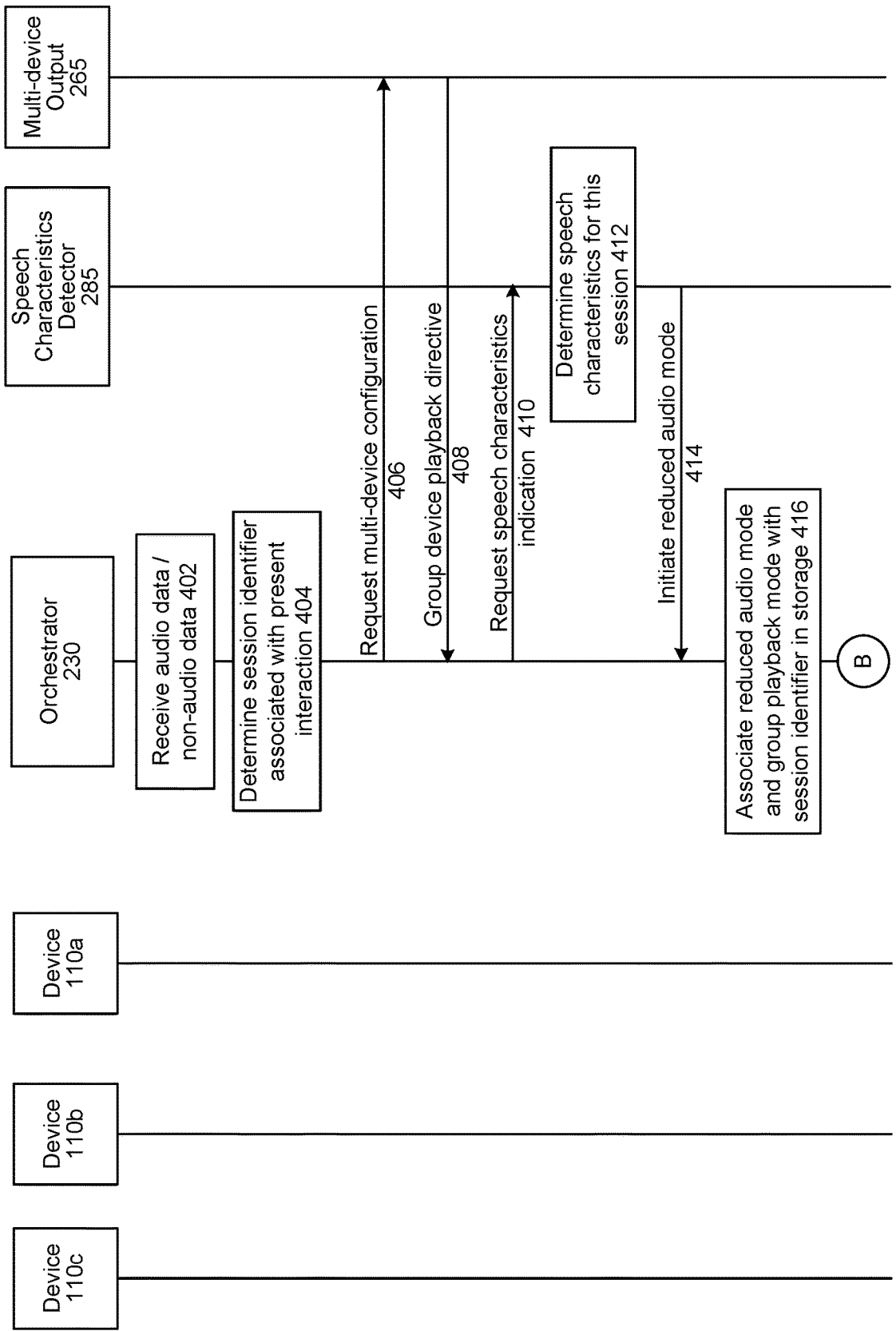

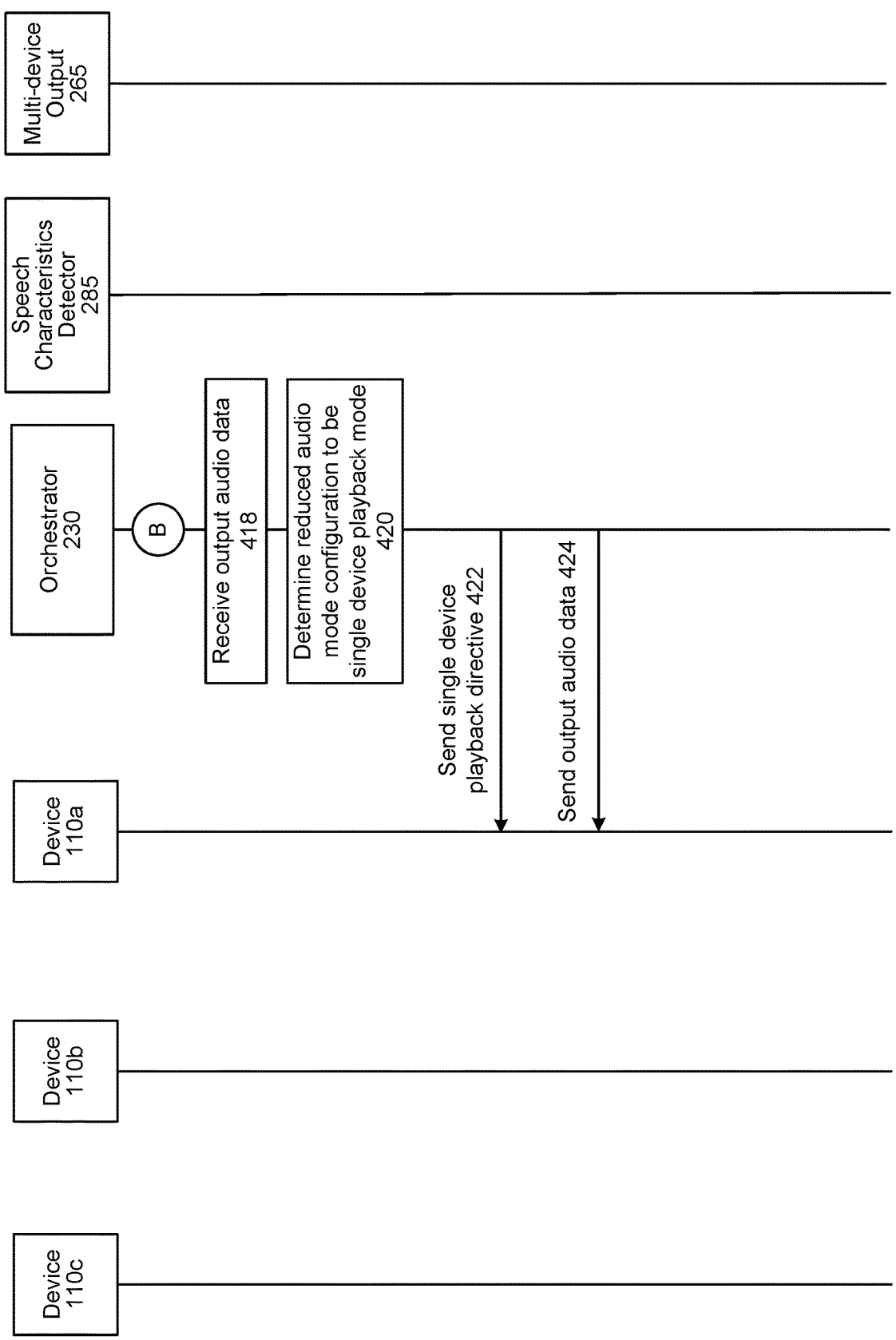

MULTI-DEVICE OUTPUT MANAGEMENT

CROSS REFERENCE TO RELATED APPLICATIONS

This application is a continuation of, and claims priority to, U.S. patent application Ser. No. 18/347,171, entitled "MULTI-DEVICE OUTPUT MANAGEMENT BASED ON SPEECH CHARACTERISTICS", filed on Jul. 5, 2023, which is a continuation of U.S. patent application Ser. No. 17/849,820, entitled "MULTI-DEVICE OUTPUT MANAGEMENT BASED ON SPEECH CHARACTERISTICS", filed on Jun. 27, 2022, now issued as U.S. Pat. No. 11,783,833 which is a continuation of U.S. patent application Ser. No. 16/834,874, entitled "MULTI-DEVICE OUTPUT MANAGEMENT BASED ON SPEECH CHARACTERISTICS", filed on Mar. 30, 2020, now issued as U.S. Pat. No. 11,393,471. The above applications are herein incorporated by reference in their entireties.

BACKGROUND

Spoken language understanding (SLU) systems have progressed to the point where humans can interact with computing devices using their voices. Such systems employ techniques to identify the words spoken by a human user based on the various qualities of a received audio input. An SLU system combines speech recognition and natural language understanding processing techniques enabling speech-based user control of a computing device to perform tasks based on the user's spoken commands. The combination of speech recognition and natural language understanding techniques is referred to herein as natural language processing. Natural language processing may also involve converting a user's speech into text data which may then be provided to various text-based software applications.

Spoken language understanding may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIGS. 3A and 3B are signal flow diagrams illustrating how a system may provide output for a multi-device configuration according to embodiments of the present disclosure.

FIGS. 4A and 4B are signal flow diagrams illustrating how a system may provide output for a multi-device configuration in an alternate output mode according to embodiments of the present disclosure.

DETAILED DESCRIPTION

Figure 1:
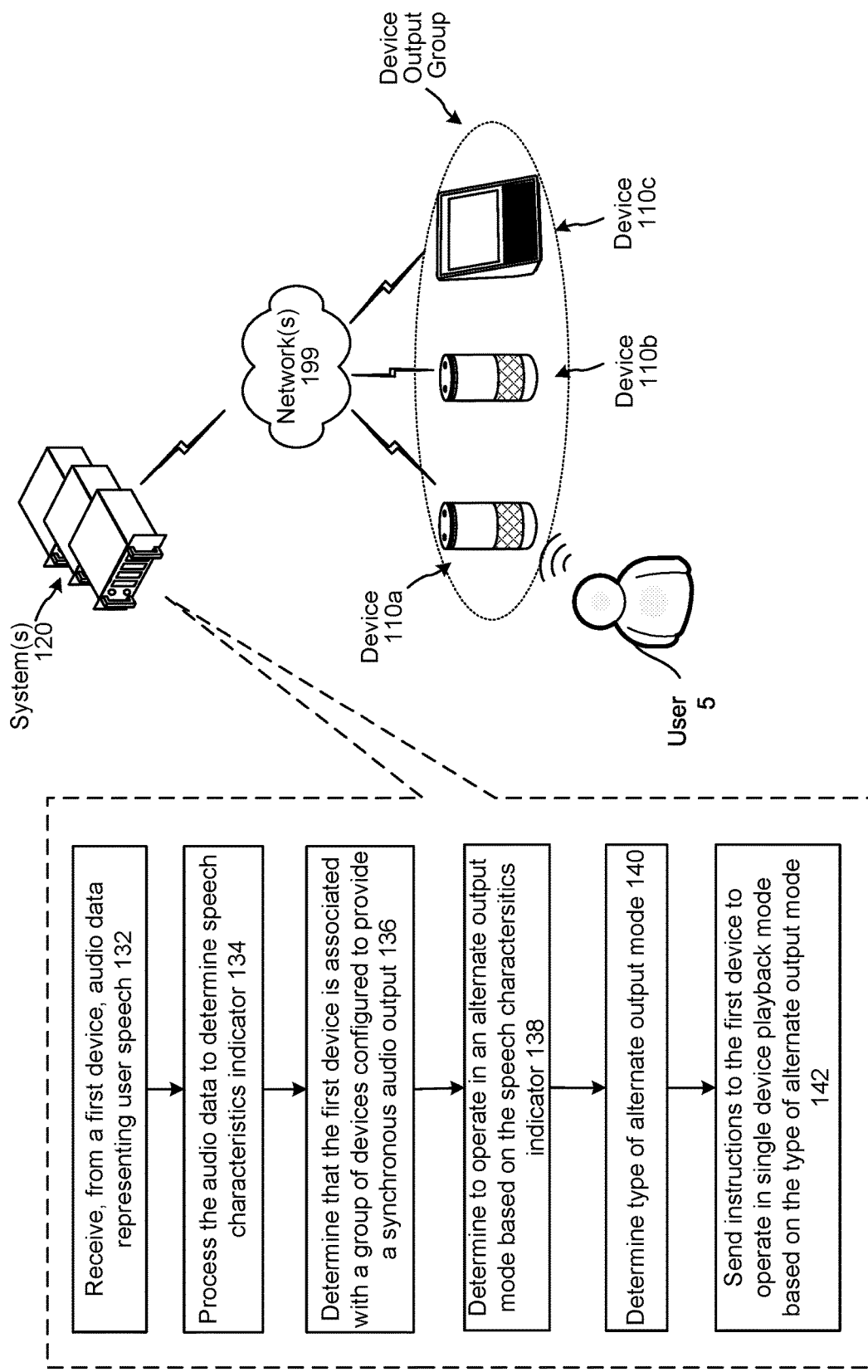
FIG. 1 illustrates a system configured to present an output based on a characteristic of speech according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a spoken language understanding (SLU) system. Text-to-speech (TTS) is a field of concerning transforming textual data into audio data that is synthesized to resemble human speech.

A system may be configured to receive user speech, process the speech to determine a requested action (e.g., operation to be performed or content to be output), and perform the action. For example, a user may say "Alexa, play Adele" and, in response, the system may output music by Adele to the user. In some cases, the user may request to receive an output via multiple devices, and the system may be configured to provide the output via the multiple devices in a synchronous manner. For example, a user may say "Alexa play music on all my kitchen devices," and the system may determine a group of devices that are to output music, where the group includes devices associated with the user's profile and located in the user's kitchen. In other cases, the user may have previously specified a pair of devices or a group of devices that are to provide output (e.g., audio output) in a synchronous manner. When a device in the user's predefined group receives a user input, all the devices in the predefined group may provide a responsive output. For example, a user may have defined a group of devices to include a first speaker, a second speaker and a subwoofer, and the first speaker may capture the user input "Alexa, play some music." The system causes the first speaker, the second speaker and the subwoofer to output music based on the predefined group of devices configured to provide a synchronous output.

A user may speak to a device (e.g., a speech-detection device) of a system in different manners. For example, a user may speak to the device in normal tone and tempo, may whisper to the device, may shout to the device, may say something rapidly to the device, and the like.

The user may desire the system to configure its output based on how the user speaks to the device. For example, if a user whispers to a device, the user may desire whispered synthesized speech be output in response. For further example, if a user whispers to a device, the user may desire responsive music to be output at a lower volume than if the user spoke at a normal volume to the device. When a system modifies its output to match a whispered user input, the system may operate in whisper/alternate output mode.

The system of the present disclosure provides techniques for providing an output in a multi-device output configuration while operating in an alternate output mode, which may include an alternate output mode. The system may determine an alternate output mode configuration for output that is expected to be received via multiple devices in a synchronous manner. In an example, a device in a predefined group of devices (that are configured to present synchronous output) may receive a user input "Alexa play music", the system may determine that the user whispered the input, and the system may determine to operate in the alternate output mode by causing music to be output only one device in the group. In another example, a group of devices may be outputting audio in a synchronous manner in response to a previous user input, and the user may whisper a subsequent user input causing the system to operate in the alternate output mode by lowering the output volume of all devices in the group, by ceasing output from all devices of the group (and only outputting audio via a subset of the devices), or a combination of lowering the volume and outputting via a subset of the devices.

FIG. 1 illustrates a system configured to present an output based on characteristics of speech according to embodiments of the present disclosure. Although the figures and discussion of the present disclosure illustrate certain operational steps of the system in a particular order, the steps described may be performed in a different order (as well as certain steps removed or added) without departing from the intent of the disclosure. A device 110a, a device 110b, and a device 110c local to a user 5, one or more systems 120, and one or more skill systems 225 may communicate across one or more networks 199. The device 110a, the device 110b and the device 110c may form a device output group as shown in FIG. 1. The device 110a, 110b and 110c may be within an environment, for example, a room in the user's house, an office, etc.

The system(s) 120 receives (132), from a first device 110a, audio data representing user speech. The audio data may correspond to a user input in the form of an utterance spoken by the user 5 and captured by the device 110a. The system(s) 120 may perform automatic speech recognition (ASR) using the audio data to determine text data representing the utterance. ASR may be performed on the audio data as described in detail below. The system(s) 120 may also perform natural language understanding (NLU) as described below to determine an intent corresponding to the user input. In an example, the system(s) 120 may determine that the user's intent is to receive audio, such as music or audio corresponding to a movie or TV show. The system(s) 120 may determine output audio data responsive to the user input, and may perform the steps described below to determine how the output audio is presented to the user 5.

The system(s) 120 processes (134) the audio data to determine a speech characteristic indicator representing a characteristic(s) of the speech. The speech characteristics indicator may represent the speech was whispered, shouted, spoken fast, or the like. Details on how the system(s) 120 may determine the speech characteristics indicator are described below in connection to a speech characteristics detector 285 shown in FIG. 2.

The system(s) 120 determines (136) that the first device 110a is associated with a group of devices configured to provide a synchronous audio output (e.g., in a multi-device configuration). The first device 110a may be associated with the shown device output group including device 110b and 110c, and the system(s) 120 may determine that output data/audio data is to be presented in a group device playback mode. Details on how the system(s) 120 may determine that output is to be provided via a multi-device configuration are described below in connection to a multi-device output component 265 shown in FIG. 2.

The system(s) 120 determines (138) to operate in an alternate output mode based on the speech characteristics indicator determined by step 134. In this example, the speech characteristics indicator may indicate that the user 5 whispered the user input received at step 132. The system(s) 120 may present an output in a variety of ways when operating in an alternate output mode and the output is to be provided via a multi-device configuration. In this example, the system(s) 120 may determine to provide the output via a single device of the device output group, rather than providing the output via all the devices in the device output group. For example, the system(s) 120 may determine to provide the output via the first device 110a. If the system(s) 120 was not operating in an alternate output mode, then the output would be provided via the device output group—devices 110a, 110b and 110c.

The system(s) 120 determines (140) a type of alternate output mode for presenting the output. The various types of alternate output mode (alternative to the group/multi-device synchronous output described in relation to FIGS. 7 and 8 below) may include presenting the output via one device in the group of devices, presenting the output at a lower volume via all the devices in the group, presenting the output via a subset of the devices in the group (fewer devices than all of the devices in the group), or a combination of thereof. The system(s) 120 may determine the type of alternate output mode based on the speech characteristic indicator, the content of the output, the output type, user preferences, skill system preferences, device capabilities (for the device(s) selected to present the output), contextual data associated with the user input, etc. In this case, the system(s) 120 may determine the alternate output mode type to be single device playback/outputting using one device in the group, for example, the device 110a that received the user input.

Based on the above determination, the system(s) 120 sends (142) instructions to the first device 110a to operate in a single device playback mode causing only the first device 110a to output audio or other types of output determined by the system(s) 120 to be responsive to the user input.

In some embodiments, the system(s) 120 may determine to operate in the alternate output mode based on non-audio data detected by the devices 110 or determined by the system(s) 120. Non-audio data may include data detected by one or more sensors (e.g., light sensors, camera, etc.), time/day information, user preferences, "do not disturb" mode, etc. For example, the alternate output mode may be triggered when the lights in a room are dimmed or turned off. In another example, the alternate output mode may be triggered when it is evening or night time and the users in the household are usually getting ready for bed. In another example, the alternate output mode may be triggered when a particular user state is detected, for example, it is determined that the user is sleeping. In yet another example, the user input may be received at normal voice, but based on the non-audio data indicating that it is night time, the system(s) 120 may determine to operate in the alternate output mode.

The system(s) 120 may operate in a whisper mode for a duration of a session or interaction, where the usual multi-device configuration output is modified based on an alternate output mode configuration. The next time a user interacts with the system in a normal voice, then the system(s) 120 may present an output per the usual multi-device configuration. Thus, when in the alternate output mode, the system(s) 120 may temporarily modify how an output is presented via the multi-device configuration.

In some embodiments, to operate in an alternate output mode, the system(s) 120 may determine to present the output at a lower volume than the volume that the devices 110 in the device output group are usually set for. For example, if a user whispers "Alexa, play some music," and the input is captured by a device 110 that is part of the device output group configured for synchronous audio output, then the system(s) 120 may determine to output music at a lower volume via the devices 110 in the device output group. In another example, the devices 110 in the device output group may be outputting music at a first volume, and the system(s) 120 may determine to initiate an alternate output mode based on some non-audio data, then the system(s) 120 may cause the devices 110 to output music at a second volume lower than the first volume. In some embodiments, the system(s) 120 may determine to lower the volume by a certain percentage for all the devices 110 in the group, or may determine to lower the volume by a certain amount for all the devices 110 in the group. In some embodiments, the system(s) 120 may use normalization techniques to determine the lower volume level for the devices 110 in the group.

In some embodiments, to operate in an alternate output mode, the system(s) 120 may determine to present the output via a subset of the devices in the device output group, rather than all of the devices in the group. For example, if a user whispers "Alexa play some music," and the input is captured by a device 110 that is part of the device output group configured for synchronous audio output, then the system(s) 120 may determine to output music via the first device 110a and the second device 110b (but not via the device 110c). In another example, the devices 110 in the device output group may all be outputting music, and the system(s) 120 may determine to initiate the alternate output mode based on some non-audio data, then the system(s) 120 may cause one of the devices 110c in the group to stop outputting music.

In some embodiments, the system(s) 120 may determine which alternate output mode configuration to use for multi-device output based on various factors indicated by user preferences, contextual information related to the user input, past user interactions, system configurations, device configurations, type of output to be presented, the intent of the user input, and other data.

In some embodiments, when operating in alternate output mode the system(s) 120 may perform other actions. The other actions may be performed based on the speech characteristic indicator. The other actions may include controlling/dimming one or more light devices associated with the user profile, setting devices to "do not disturb" mode, setting devices to vibrate/silent notifications, directing notifications/output to other devices, etc. Other actions may also include increasing an output volume of a device/speaker.

Figure 2:
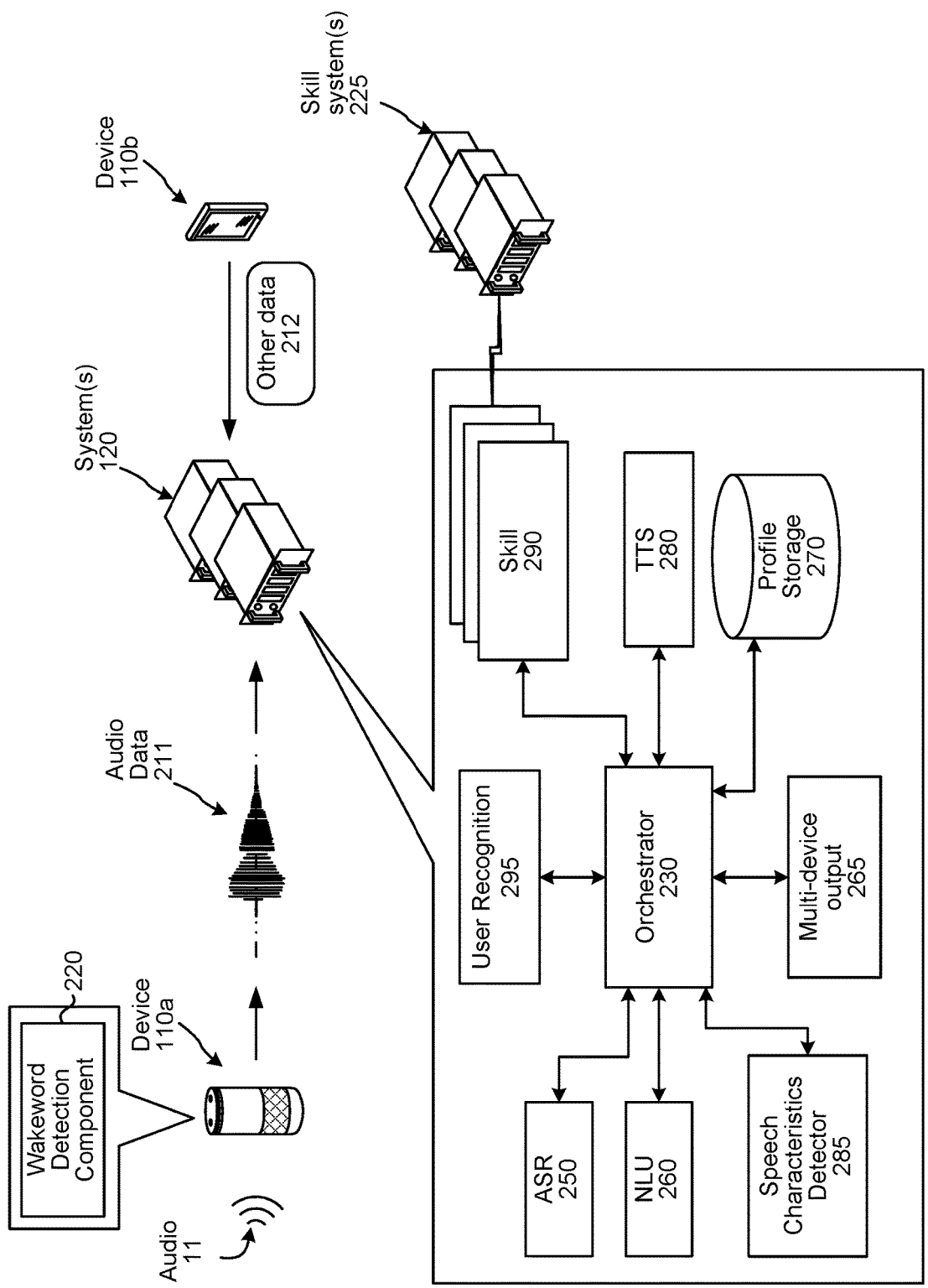
FIG. 2 is a conceptual diagram for processing user input according to embodiments of the present disclosure.

The system may operate using various components as illustrated in FIG. 2. The various components may be located on the same or different physical devices. Communication between various components may occur directly or across a network(s) 199.

An audio capture component(s), such as a microphone or array of microphones of a device 110, captures audio 11. The device 110 processes audio data, representing the audio 11, to determine whether speech is detected. The device 110 may use various techniques to determine whether audio data includes speech. In some examples, the device 110 may apply voice activity detection (VAD) techniques. Such techniques may determine whether speech is present in audio data based on various quantitative aspects of the audio data, such as the spectral slope between one or more frames of the audio data; the energy levels of the audio data in one or more spectral bands; the signal-to-noise ratios of the audio data in one or more spectral bands; or other quantitative aspects. In other examples, the device 110 may implement a limited classifier configured to distinguish speech from background noise. The classifier may be implemented by techniques such as linear classifiers, support vector machines, and decision trees. In still other examples, the device 110 may apply Hidden Markov Model (HMM) or Gaussian Mixture Model (GMM) techniques to compare the audio data to one or more acoustic models in storage, which acoustic models may include models corresponding to speech, noise (e.g., environmental noise or background noise), or silence. Still other techniques may be used to determine whether speech is present in audio data.

Once speech is detected in audio data representing the audio 11, the device 110 may use a wakeword detection component 220 to perform wakeword detection to determine when a user intends to speak an input to the device 110. An example wakeword is "Alexa."

Wakeword detection is typically performed without performing linguistic analysis, textual analysis, or semantic analysis. Instead, the audio data, representing the audio 11, is analyzed to determine if specific characteristics of the audio data match preconfigured acoustic waveforms, audio signatures, or other data to determine if the audio data "matches" stored audio data corresponding to a wakeword.

Thus, the wakeword detection component 220 may compare audio data to stored models or data to detect a wakeword. One approach for wakeword detection applies general large vocabulary continuous speech recognition (LVCSR) systems to decode audio signals, with wakeword searching being conducted in the resulting lattices or confusion networks. LVCSR decoding may require relatively high computational resources. Another approach for wakeword detection builds HMMs for each wakeword and non-wakeword speech signals, respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on wakeword presence. This approach can be extended to include discriminative information by incorporating a hybrid DNN-HMM decoding framework. In another example, the wakeword detection component 220 may be built on deep neural network (DNN)/recursive neural network (RNN) structures directly, without HMM being involved. Such an architecture may estimate the posteriors of wakewords with context information, either by stacking frames within a context window for DNN, or using RNN. Follow-on posterior threshold tuning or smoothing is applied for decision making. Other techniques for wakeword detection, such as those known in the art, may also be used.

Once the wakeword is detected, the device 110 may "wake" and begin transmitting audio data 211, representing the audio 11, to the system(s) 120. The audio data 211 may include data corresponding to the wakeword, or the portion of the audio corresponding to the wakeword may be removed by the device 110 prior to sending the audio data 211 to the system(s) 120.

Upon receipt by the system(s) 120, the audio data 211 may be sent to an orchestrator component 230. The orchestrator component 230 may include memory and logic that enables the orchestrator component 230 to transmit various pieces and forms of data to various components of the system, as well as perform other operations as described herein.

The orchestrator 230 may send the audio data 211 to a speech characteristics detector 285. The system(s) 120 may be configured with the speech characteristics detector 285. Some systems may implement the speech characteristics detector 285 as part of the ASR component 250.

The speech quality detector 285 may be capable of determining various qualities/characteristics of the speech represented in the audio data 211. Such characteristics include, for example, whether the speech was whispered, whether the speech was spoken in an excited voice, whether the speech was spoken in a sad voice, whether the speech was whined, whether the speech was shouted, etc. The speech characteristics detector 285 may output a speech characteristics indicator representing the one or more speech characteristics/qualities of the speech in the audio data 211. Each speech characteristic in the speech characteristics indicator may be associated with a confidence value. Each confidence value may be a binned value (e.g., high, medium, low) or numeric value (e.g., a value from 0 to 1, or some other scale). Each speech characteristic in the speech characteristics indicator may alternatively be represented as a binary value (e.g., yes or no) indicating whether the speech exhibited that particular speech characteristic. The speech characteristics indicator may include values if the speech characteristics detector 285 assumes the audio data is comprised of high-quality signals. If such an assumption is not made, signal quality may be one factor in determine a confidence value for a particular speech characteristic.

The speech characteristics detector 285 may process based on paralinguistic metrics that describe some characteristic/feature other than the specific words spoken. Paralinguistic features may include acoustic features such as speech tone/pitch; rate of change of pitch (e.g., first derivative of pitch); speed; prosody/intonation; resonance; energy/volume; hesitation; phrasing; nasality; breath; whether the speech includes a cough, sneeze, laugh, or other non-speech articulation; detected background audio/noises; distance between the user and a device 110; etc.

For example, the speech characteristics detector 285 may determine speech was whispered based on audio (and possibly non-audio) paralinguistic feature data. Whispered speech is typically "unvoiced," that is words are spoken using articulators (e.g., mouth, lips, tongue, etc.) as normal, but without use/vibration of vocal cords such that the speech has no resonance, or resonance below a certain threshold. Vocal resonance occurs when the product of voicing (i.e., phonation) is enhanced in tone quality (i.e., timbre) and/or intensity by the air-filled cavities through which speech passes on the speech's way to the outside air. During whispering, air comes through the throat without being modulated by the vocal cords so that what is left is motion of the articulators resulting in a stream of air without valve structure. Whispered speech may also include speech that is at a low volume or volume below a threshold. Some combination of low to no resonance combined with low volume may constitute a whisper for purposes of the speech characteristics detector's processing. As noted below, a machine learning model may be trained to recognize whispered speech based on resonance, volume, and/or other features of the audio data 211.

The speech characteristics detector 285 may determine that speech has resonance below a threshold and/or a volume below a threshold. Thus, the speech characteristics detector 285 may determine that the speech has a speech characteristic corresponding to a whisper/approximated whisper. The speech characteristics detector 285 may be trained to analyze paralinguistic feature data to make a decision as to whether speech is whispered. While the speech characteristics detector 285 may determine whether speech is whispered based on whether a particular paralinguistic feature value(s) is below a threshold (e.g., whether speech has a resonance under a particular threshold and/or a volume under a particular threshold, etc.), more complex decision making is possible using machine learning models and training techniques. Thus, paralinguistic feature values, whether from the audio data 211 or non-audio data (e.g., indicated by/included in other data 212), may be input as features to the speech characteristics detector 285.

The speech characteristics detector 285 may determine speech qualities other than whether speech was whispered. For example, based on parametric features, the speech characteristics detector 285 may determine whether the user was speaking in a scoffing or sarcastic tone, the user was sniffing or dismissive, the user was whining, the user sneezed or coughed, the user was talking under his/her breath with others present so only the device 110 will detect the speech, speech distance, etc.

The speech characteristics detector 285 may implement a single model that outputs a speech characteristics indicator, or may implement a plurality of models, each configured to determine, based on feature values input to the model, whether the speech corresponds to a particular characteristic. For example, one model may be configured to determine whether speech was whispered, another model may be configured to determine whether speech was whined, etc. Or, as noted, a single model may be configured to determine multiple speech characteristics indicators that may apply to speech based on that speech's qualities. The speech characteristics detector 285 may operate within the ASR component 250 (as illustrated) or as a separate component as part of system(s) 120.

One or more models used by the speech characteristics detector 285 may be trained specific to a user. For example, a user may have a health problem that causes them to speak in a manner that, if not trained specific to a user, would cause a model(s) to determine the user was whispering. Thus, the speech characteristics detector 285 may receive a user profile identifier output by the user recognition component 295, determine one or more trained models associated with the user profile identifier, and perform speech quality detection using those trained models.

The speech characteristics detector 285 may also consider non-audio data and non-audio features when determining a characteristic of speech, where the non-audio data and non-audio features may be derived from the other data 212 provided by one or more devices 110. For example, if a camera (associated with a device 110b) detects the user 5, the speech characteristics detector 285 may analyze video data including in the other data 212 (received from the camera) to determine some characteristics of the user (e.g., agitated, subdued, angry, etc.). Other non-audio data may also be input to the speech characteristics detector 285. For example, time/date data, location data included in the other data 212 (e.g., GPS location or relative indoor room location of the device 110), ambient light data included in the other data 212 from a light sensor, the identity of nearby individuals to the user (using the other data 212), proximity of the user to the device 110, etc. In a particular example, if user speech is received after a particular time of day (e.g., after a time of day when a user may go to sleep), the system may determine the speech corresponds to a whisper speech characteristic even if the speech was not whispered. The time of data a user may be considered to go to sleep may be specific to a user and may be determined using user profile data stored in profile storage 270. In another particular example, if user speech is received from a particular location after a particular time of day (e.g., from a user device in a bedroom after a particular time of day), the system may determine the speech corresponds to a whisper speech quality even if the speech was not whispered. Thus, the speech characteristics detector 285 may consider user profile data. The types of acoustic and non-audio data considered by the speech characteristics detector 285 in determining one or more characteristics of specific speech depends on the types of such data available to the system.

The speech characteristics detector 285 may consider image data to determine a gesture of a user. The speech characteristics detector 285 may consider the gesture in determining a speech characteristics of the user input. The gesture may corresponding to a facial gesture. The gesture may also correspond to a gesture performed by body parts other than the face of the user (e.g., motion of one or more arms of the user).

The speech characteristics detector 285 may consider various data representing an environment of the user.

The model(s) available to the speech characteristics detector 285 may be trained on the various data types available to the speech characteristics detector 285. For example, a first model may be trained to detect that speech is whispered whereas a second model may be trained to determine that ambient light data from a light sensor is below a certain threshold. The output from the second model (or more simply, an output from a component such as the light sensor) may indicate to the first model that the atmosphere is dark, which may be used to increase a confidence of the first model that the speech was whispered. Thus, one model's output may impact another model's output. The outputs of all models may be collectively used by the speech characteristics detector 285 to determine one or more speech characteristics of the speech.

Various machine learning techniques may be used to train and/or operate the machine learning models usable by the speech characteristics detector 285. In machine learning techniques, component is "trained" by repeatedly providing it examples of data and how the data should be processed using an adaptive model until it can consistently identify how a new example of the data should be processed, even if the new example is different from the examples included in the training set. Getting an adaptive model to consistently identify a pattern is in part dependent upon providing the component with training data that represents the desired decision features in such a way that patterns emerge. Providing data with consistent patterns and recognizing such patterns when presented with new and different data is within the capacity of today's systems.

For example, as above, a component (e.g., the speech characteristics detector 285) may be trained using example audio data segments and different values for the various paralinguistic data features available to the system. Different models may be trained to recognize different speech qualities or a single model may be trained to identify applicable speech qualities associated with particular speech. For example, a single model may be trained to analyze both audio and non-audio data to determine a speech characteristic. Alternatively, a certain model(s) may be trained to analyze audio data and a separate model(s) may be trained to analyze non-audio data.

Example machine learning techniques include neural networks, inference engines, trained classifiers, etc. Examples of trained classifiers include support vector machines (SVMs), neural networks, decision trees, AdaBoost (short for "Adaptive Boosting") combined with decision trees, and random forests. Focusing on SVM as an example, SVM is a supervised learning model with associated learning algorithms that analyze data and recognize patterns in the data, and which are commonly used for classification and regression analysis. Given a set of training examples, each marked as belonging to one of two categories, an SVM training algorithm builds a model that assigns new examples into one category or the other, making it a non-probabilistic binary linear classifier. More complex SVM models may be built with the training set identifying more than two categories, with the SVM determining which category is most similar to input data. An SVM model may be mapped so the examples of the separate categories are divided by clear gaps. New examples are then mapped into that same space and predicted to belong to a category based on which side of the gaps they fall on. Classifiers, either binary or multiple category classifiers, may issue a "score" indicating which category the data most closely matches. The score may provide an indicator of how closely the data matches the category. For example, in the present disclosure, a SVM may be trained to process audio data, for example audio feature vectors, to determine if speech was whispered. Among the factors the SVM may consider is whether the speech has a resonance below a resonance threshold and/or a volume below a volume threshold. Other features of the speech may also be considered when the SVM classifies the speech as whispered or not whispered.

Training a model requires establishing a "ground truth" for the training examples. In machine learning, the term "ground truth" refers to the accuracy of a training set's classification for supervised learning techniques. Various techniques may be used to train the models including backpropagation, statistical learning, supervised learning, semi-supervised learning, stochastic learning, or other known techniques. Many different training example utterances may be used to train the models used by the speech characteristics detector 285.

For example, a model, such as a SVM classifier, may be trained to recognize when speech is whispered using many different training utterances, each labeled either "whispered" or "not whispered." Each training utterance may also be associated with various feature data corresponding to the respective utterance, where the feature data indicates values for the acoustic and/or non-audio paralinguistic features that may be used to determine if further speech is whispered. The model may be constructed based on the training utterances and then disseminated to the speech characteristics detector 285, which uses the model(s) to make decisions at runtime as to whether speech was whispered. Similar training may take place for different speech qualities (e.g., excitement, boredom, etc.) where different models are trained or a single model is trained.

The orchestrator component 230 sends the input audio data 211 to an ASR component 250 that transcribes the input audio data 211 into input text data representing one more hypotheses representing speech contained in the input audio data 211. The text data output by the ASR component 250 may thus represent one or more than one (e.g., in the form of an N-best list) ASR hypotheses representing speech represented in the audio data 211. The ASR component 250 interprets the speech in the audio data 211 based on a similarity between the audio data 211 and pre-established language models. For example, the ASR component 250 may compare the audio data 211 with models for sounds (e.g., subword units, such as phonemes, etc.) and sequences of sounds to identify words that match the sequence of sounds of the speech represented in the audio data 211. The ASR component 250 outputs text data representing one or more ASR hypotheses. The ASR component 250 may also output respective scores for the one or more ASR hypotheses. Such text data and scores may be output, for example, following language model operations by the ASR component 250. Thus the text data output by the ASR component 250 may include a top scoring ASR hypothesis or may include an N-best list of ASR hypotheses. An N-best list may additionally include a respective score associated with each ASR hypothesis represented therein. Each score may indicate a confidence of ASR processing performed to generate the ASR hypothesis with which the score is associated. Further details of the ASR processing are included below.

The device 110 may send text data to the system(s) 120. Upon receipt by the systems(s) 120, the text data may be sent to the orchestrator component 230, which may send the text data to the NLU component 260. The text data may be derived from an input(s) provided by the user 5 via an application/app on the device 110, where the user 5 may use the application/app to create a subscription (as described in connection with FIG. 1). The text data, for example, may be "notify me when I get an email from _____" or "tell me when my prescription for _____ is ready for pickup at the pharmacy."

The NLU component 260 receives the ASR hypothesis/hypotheses (i.e., text data) attempts to make a semantic interpretation of the phrase(s) or statement(s) represented therein. That is, the NLU component 260 determines one or more meanings associated with the phrase(s) or statement(s) represented in the text data based on words represented in the text data. The NLU component 260 determines an intent representing an action that a user desires be performed as well as pieces of the text data that allow a device (e.g., the device 110, the system(s) 120, a skill 290, a skill system(s) 225, etc.) to execute the intent. For example, if the text data corresponds to "play Adele music," the NLU component 260 may determine an intent that the system(s) 120 output music and may identify "Adele" as an artist. For further example, if the text data corresponds to "what is the weather," the NLU component 260 may determine an intent that the system(s) 120 output weather information associated with a geographic location of the device 110. In another example, if the text data corresponds to "turn off the lights," the NLU component 260 may determine an intent that the system(s) 120 turn off lights associated with the device(s) 110 or the user(s) 5.

The NLU component 260 may send NLU results data (which may include tagged text data, indicators of intent, etc.) to the orchestrator component 230. The orchestrator component 230 may send the NLU results data to a skill(s) 290. If the NLU results data includes a single NLU hypothesis, the orchestrator component 230 may send the NLU results data to the skill(s) 290 associated with the NLU hypothesis. If the NLU results data includes an N-best list of NLU hypotheses, the orchestrator component 230 may send the top scoring NLU hypothesis to a skill(s) 290 associated with the top scoring NLU hypothesis.

A "skill" may be software running on the system(s) 120 that is akin to a software application running on a traditional computing device. That is, a skill 290 may enable the system(s) 120 to execute specific functionality in order to provide data or produce some other requested output. The system(s) 120 may be configured with more than one skill 290. For example, a weather service skill may enable the system(s) 120 to provide weather information, a car service skill may enable the system(s) 120 to book a trip with respect to a taxi or ride sharing service, a restaurant skill may enable the system(s) 120 to order a pizza with respect to the restaurant's online ordering system, etc. A skill 290 may operate in conjunction between the system(s) 120 and other devices, such as the device 110, in order to complete certain functions. Inputs to a skill 290 may come from speech processing interactions or through other interactions or input sources. A skill 290 may include hardware, software, firmware, or the like that may be dedicated to a particular skill 290 or shared among different skills 290.

In addition or alternatively to being implemented by the system(s) 120, a skill 290 may be implemented by a skill system(s) 225. Such may enable a skill system(s) 225 to execute specific functionality in order to provide data or perform some other action requested by a user.

Types of skills include home automation skills (e.g., skills that enable a user to control home devices such as lights, door locks, cameras, thermostats, etc.), entertainment device skills (e.g., skills that enable a user to control entertainment devices such as smart televisions), video skills, flash briefing skills, as well as custom skills that are not associated with any preconfigured type of skill.

The system(s) 120 may be configured with a single skill 290 dedicated to interacting with more than one skill system 225.

Unless expressly stated otherwise, reference to a skill, skill device, or skill component may include a skill 290 operated by the system(s) 120 and/or skill operated by the skill system(s) 225. Moreover, the functionality described herein as a skill may be referred to using many different terms, such as an action, bot, app, or the like.

The system(s) 120 may be configured with a multi-device output component 265. The multi-device component 265 may be configured to determine when audio output is to be provided via multiple devices in a synchronous manner. In some embodiments, the user may have defined a group of devices that are to output audio (e.g., music, movie or TV audio, etc.) in a synchronous manner. The user may define/set up the group using a companion application via a mobile device 110 or other type of device 110. The devices may be purchased together as a group (e.g., a stereo set, a surround system, home theatre system, etc.), and the multi-device output component 265 may determine the group based on the stereo/surround system configurations. For example, a group of devices may include a right stereo speaker, a left stereo speaker and a subwoofer. In some cases, the user may want to listen to certain audio in an immersive experience, where the right and left stereo speakers and subwoofer output the audio synchronously.

In another example, a group of devices may include a first device (e.g., a smart speaker), a second device (e.g., a display device with a speaker), a third device (e.g., another smart speaker), etc., and the user may want to receive audio via all the devices in the group. The multi-device output component 265 may determine which devices associated with the user profile are included in such a group to output audio synchronously.

In some embodiments, the group of devices may include devices corresponding to a 5.1 surround sound system or a 7.1 surround sound system. A 5.1 surround sound system may be a six-channel system using five full bandwidth channels and one low-frequency effects channel. A 7.1 surround sound system may be an eight-channel system using seven full bandwidth channels and one low-frequency effects channel.

As used herein, devices providing output "synchronously" may refer to in some cases the devices providing output "simultaneously", and in other cases the devices may not provide an output "simultaneously." For example, in a surround sound system, a rear-left channel may output audio at a different time than a front-right channel depending on the song/soundtrack or other output content, etc.

In some embodiments, the multi-device output component 265 may determine a master device that is to receive the audio data for output. The orchestrator 230 may send the audio data to the selected/determined master device, and the master device may distribute/provide the audio data to the other devices in the group for output. The master device may coordinate the audio output with the other devices in the group so that the output is provided in a synchronous manner. For example, the right stereo speaker may be selected as the master device, the orchestrator 230 may send the output audio data to the right stereo speaker, and the right stereo speaker may send the output audio data to the left stereo speaker and the subwoofer for synchronous output. In some embodiments, the device that received the user input is selected as the master device.

In some embodiments, the multi-device output component 265 may send a group device playback directive to the orchestrator 230 upon determination that the device that captured the user input is associated with a group of devices to provide a synchronous audio output. The orchestrator 230 may send the group device playback directive/instruction to the master device causing the master device to distribute the output audio data to the other devices in the group. The orchestrator 230 may also send device identifiers or other identifying information for the devices in the group that are to receive the audio output data for synchronously playback.

In some embodiments, the system(s) 120 may provide synchronous output of synthesized speech or other types of output via multiple devices, using the technique described above.

The system(s) 120 may include a TTS component 280 that generates audio data (e.g., synthesized speech) from text data using one or more different methods. Text data input to the TTS component 280 may come from a skill 290, the orchestrator component 230, or another component of the system(s) 120.

In one method of synthesis called unit selection, the TTS component 280 matches text data against a database of recorded speech. The TTS component 280 selects matching units of recorded speech and concatenates the units together to form audio data. In another method of synthesis called parametric synthesis, the TTS component 280 varies parameters such as frequency, volume, and noise to create audio data including an artificial speech waveform. Parametric synthesis uses a computerized voice generator, sometimes called a vocoder.

The system(s) 120 may include profile storage 270. The profile storage 270 may include a variety of information related to individual users, groups of users, devices, etc. that interact with the system(s) 120. A "profile" refers to a set of data associated with a user, device, etc. The data of a profile may include preferences specific to the user, device, etc.; input and output capabilities of the device; internet connectivity information; user bibliographic information; subscription information; as well as other information.

The profile storage 270 may include one or more user profiles, with each user profile being associated with a different user identifier. Each user profile may include various user identifying information. Each user profile may also include preferences of the user and/or one or more device identifiers, representing one or more devices registered to the user.

The profile storage 270 may include one or more group profiles. Each group profile may be associated with a different group profile identifier. A group profile may be specific to a group of users. That is, a group profile may be associated with two or more individual user profiles. For example, a group profile may be a household profile that is associated with user profiles associated with multiple users of a single household. A group profile may include preferences shared by all the user profiles associated therewith. Each user profile associated with a group profile may additionally include preferences specific to the user associated therewith. That is, each user profile may include preferences unique from one or more other user profiles associated with the same group profile. A user profile may be a stand-alone profile or may be associated with a group profile. A group profile may include one or more device profiles representing one or more devices associated with the group profile.

The profile storage 270 may include one or more device profiles. Each device profile may be associated with a different device identifier. Each device profile may include various device identifying information. Each device profile may also include one or more user identifiers, representing one or more user profiles associated with the device profile. For example, a household device's profile may include the user identifiers of users of the household.

The system(s) 120 may include a user recognition component 295. The user recognition component 295 may take as input the audio data 211, text data, and/or text data output by the ASR component 250. The user recognition component 295 determines scores indicating whether user input originated from a particular user. For example, a first score may indicate a likelihood that the user input originated from a first user, a second score may indicate a likelihood that the user input originated from a second user, etc. The user recognition component 295 also determines an overall confidence regarding the accuracy of user recognition operations. The user recognition component 295 may perform user recognition by comparing audio characteristics in the audio data 211 to stored audio characteristics of users. The user recognition component 295 may also perform user recognition by comparing biometric data (e.g., fingerprint data, iris data, etc.) received by the system in correlation with the present user input to stored biometric data of users. The user recognition component 295 may further perform user recognition by comparing image data (e.g., including a representation of at least a feature of a user) received by the system in correlation with the present user input with stored image data (e.g., including representations of features of users). The user recognition component 295 may perform additional user recognition processes, including those known in the art. Output of the user recognition component 295 may include a single user ID corresponding to the most likely user that originated the current input. Alternatively, output of the user recognition component 295 may include an N-best list of user IDs with respective scores indicating likelihoods of respective users originating the current input. The output of the user recognition component 295 may be used to inform NLU component 260 processing, as well as processing performed by the skill components 290.

The system may be configured to incorporate user permissions and may only perform activities disclosed herein if approved by a user. As such, the systems, devices, components, and techniques described herein would be typically configured to restrict processing where appropriate and only process user information in a manner that ensures compliance with all appropriate laws, regulations, standards, and the like. The system and techniques can be implemented on a geographic basis to ensure compliance with laws in various jurisdictions and entities in which the components of the system and/or user are located.

For certain types of output (e.g., audio output corresponding to music, audio output corresponding to a movie/TV show, etc.) some devices may be grouped together such that a user request to receive output via the group is sent to a specific device in the group. In some embodiments, for such multi-device synchronous output the system(s) 120 may use data described in the table below.

TABLE 1

Example data for multi-device output

| GroupID | Group Function | Included Devices | Command destination for GroupID |
|---------|----------------|------------------|-------------------------------|
| Group 123 | Audio output | Device_1_ID, Device_2_ID, Device_3_ID | Device_1_ID |
| GroupABC | Audio output | Device_1_ID, Device_4_ID | Device_4_ID |
| GroupXYZ | Audio output | Device_5_ID, Device_6_ID, Device_7_ID, Device_8_ID | Device_5_ID |

In an example, for groupID "GroupABC" and for function "audio output", the group may include "Device_1_ID", "Device_2_ID", and "Device_3_ID", and the command for the function may be sent to "Device_1_ID" which may distribute the audio output to the other devices in the group for synchronous output. In some embodiments, the command to output data may be sent to one of the devices in the group, an interim component in the system(s) 120, an interim component in the device 110, a destination address or the like.

When operating in the alternate output mode, the system(s) 120 may circumvent the group mode, by sending the command to a different destination device and/or including in the command an instruction/directive that the destination device is to apply some modification(s) to the way the group outputs data.

FIGS. 3A and 3B are signal flow diagrams illustrating how a system may provide output for a multi-device configuration according to embodiments of the present disclosure. The orchestrator 230 may receive audio data and/or non-audio data (302). The audio data may correspond to an utterance spoken by a user. The non-audio data may be data detected/determined by one or more devices 110 relating to the user's environment. The non-audio data may be other data determined by the orchestrator 230, such as the current time/day.

The orchestrator 230 may determine a session identifier associated with the present interaction (304). The present interaction may involve the system(s) 120 responding to a user request to receive audio output. The present interaction may involve the system(s) 120 causing one or more devices 110 to present an output, such as audio corresponding to music. This action and the user request/input may be associated with a session identifier.

The orchestrator 230 may request the multi-device output component 265 to provide any multi-device configurations applicable for output (306). The orchestrator 230 may provide a device identifier to the multi-device output component 265, where the device identifier may be associated with the device (e.g., device 110*a*) that captured the audio data/user input or detected the non-audio data. The multi-device output component 265 may determine if the device identifier is associated with a group of devices that are configured to provide synchronous output. The device identifier may be associated with the device 110*a*, which may have captured/received the user request. The group of devices may include the device 110*a*, the device 110*b* and the device 110*c*. The multi-device output component 265 may determine that the device identifier is associated with a group of devices and may send a group device playback directive to the orchestrator 230 for this session (308). The multi-device output component 265 may also provide a device identifier for the master device that is distribute the output to the other devices in the group. The multi-device output component 265 may also provide device identifier(s) corresponding to the devices in the group that are to output audio in a synchronous manner. For example, the multi-device output component 265 may identify the first device 110*a* as the master device, and may identify the second device 110*b* and the third device 110*c* as included in the group of devices for synchronous playback.

The orchestrator 230 may request the speech characteristics detector 285 to provide a speech characteristics indication (310). The orchestrator 230 may provide the audio data/non-audio data to the speech quality detector. As described above, the speech characteristics detector 285 may process the audio data/non-audio data to determine a speech characteristic (that may be used to determine how the output is presented) for this session (312). The speech characteristics detector 285, in this case, may determine to operate in a normal mode because the audio data/non-audio data does not indicate circumstances to activate another mode (e.g., a whisper/quiet mode, an excited mode, etc.). The speech characteristics detector 285 may send data to the orchestrator 230 indicating not to initiate an alternate output mode (314) based on speech characteristics. In some embodiments, the speech characteristics detector 285 may not provide a response to the request (310) indicating to the orchestrator 230 to not activate any particular output modes based on speech characteristics.

The orchestrator 230 may associate a group playback mode with the session identifier (316) to indicate that output for this session is to be provided in the group playback mode. In a group playback mode, the system(s) 120 may enable the user to receive an output (e.g., audio output) via multiple devices in a synchronous manner.

Referring to FIG. 3B, the orchestrator 230 may receive output audio data (318). In some embodiments, the output audio data may be provided by a skill system(s) 225/component(s) 290 selected by the NLU component 260 to respond to the user input. The orchestrator 230 may send a group playback directive (320) to the first device 110*a*, that may be indicated as the master device by the multi-device output component 265. The group playback directive may include device identifiers for the other devices in the group. The orchestrator 230 may send output audio data to the first device 110a (322). The first device 110a, based on the group playback directive, may coordinate output with the group of devices (324) and may determine to distribute the output audio data to the other devices in the group. For example, the first device 110a may send the output audio data to the second device 110b (324) and may send the output audio data to the third device 110c (326). In this manner, the system(s) 120 may enable synchronous output of audio data via multiple devices in a group.

FIGS. 4A and 4B are signal flow diagrams illustrating how a system may provide output for a multi-device configuration in whisper mode/alternate output mode according to embodiments of the present disclosure. Referring to FIG. 4A, the orchestrator 230 may receive audio data and/or non-audio data (402). The audio data may correspond to an utterance spoken by a user. The non-audio data may be data detected/determined by one or more devices 110 relating to the user's environment. The non-audio data may be other data determined by the orchestrator 230, such as the current time/day.

The orchestrator 230 may determine a session identifier associated with the present interaction (404) (which may be a different interaction/session than the one described in relation to FIGS. 3A and 3B). The present interaction may involve the system(s) 120 responding to a user request to receive audio output. The present interaction may involve the system(s) 120 causing one or more devices 110 to present an output, such as audio corresponding to music. This action and the user request/input may be associated with a session identifier.

The orchestrator 230 may request the multi-device output component 265 to provide any multi-device configurations applicable for output (406). The multi-device output component 265 may perform the steps described in relation to step 306 of FIG. 3A, and may determine that the device identifier is associated with a group of devices and may send a group device playback directive to the orchestrator 230 for this session (408). The multi-device output component 265 may also provide a device identifier for the master device and device identifier(s) corresponding to the devices in the group that are to output audio in a synchronous manner.

The orchestrator 230 may request the speech characteristics detector 285 to provide a speech characteristics indication (410). The orchestrator 230 may provide the audio data/non-audio data to the speech quality detector. As described above, the speech characteristics detector 285 may process the audio data/non-audio data to determine a speech characteristic (that may be used to determine how the output is presented) for this session (412). The speech characteristics detector 285, in this case, may determine to operate in a whisper mode because the audio data/non-audio data indicates circumstances to activate the whisper mode. The speech characteristics detector 285 may send data to the orchestrator 230 indicating to initiate whisper mode (414) for this session.

The orchestrator 230 may associate a whisper mode and a group playback mode with the session identifier (416) to indicate that output for this session is to be provided in whisper mode and in group playback mode.

The system(s) 120 may provide output for a multi-device configuration in whisper mode/alternate output mode in a variety of manners. In some embodiments, the audio data may be outputted by only one of the devices in the group (as described in relation to FIG. 4B). In some embodiments, the audio data may be outputted at a lower volume by all of the devices in the group (as described in relation to FIG. 5). In some embodiments, the audio data may be outputted by a subset of the devices in the group (as described in relation to FIG. 6). The system(s) 120 may activate/apply whisper mode to one session, and may revert to non-whisper mode for the next/other session. Thus, whisper mode may be activated for a session and may affect a multi-device output configuration/playback mode temporarily for just that session.

Referring to FIG. 4B, the orchestrator 230 may receive output audio data (418). In some embodiments, the output audio data may be provided by a skill system(s) 225/component(s) 290 selected by the NLU component 260 to respond to the user input. The orchestrator 230 may determine the whisper mode configuration for this session (420) to be where output is provided in a single device playback mode (rather than a group device playback mode). In other words, the orchestrator 230 may determine ignore the group playback directive indicated by the multi-device output component 265 because the system(s) 120 is to operate in the whisper mode.

The orchestrator 230 may send a single device playback directive to the first device 110a (422). The first device 110a may be the master device selected by the multi-device output component 265, may be the device that captured the audio data/user input or detected the non-audio data, or may be the device the orchestrator 230 (or other components of the system(s) 120) determined as the output device.

The orchestrator 230 may send the output audio data 424 to the first device 110a causing the first device 110a to output the audio data, without coordinating with any other device per the single device playback directive. In this manner, the system(s) 120 may determine to provide audio output via a single device, instead of the group of devices, when whisper mode is activated for the session.

Figure 5:
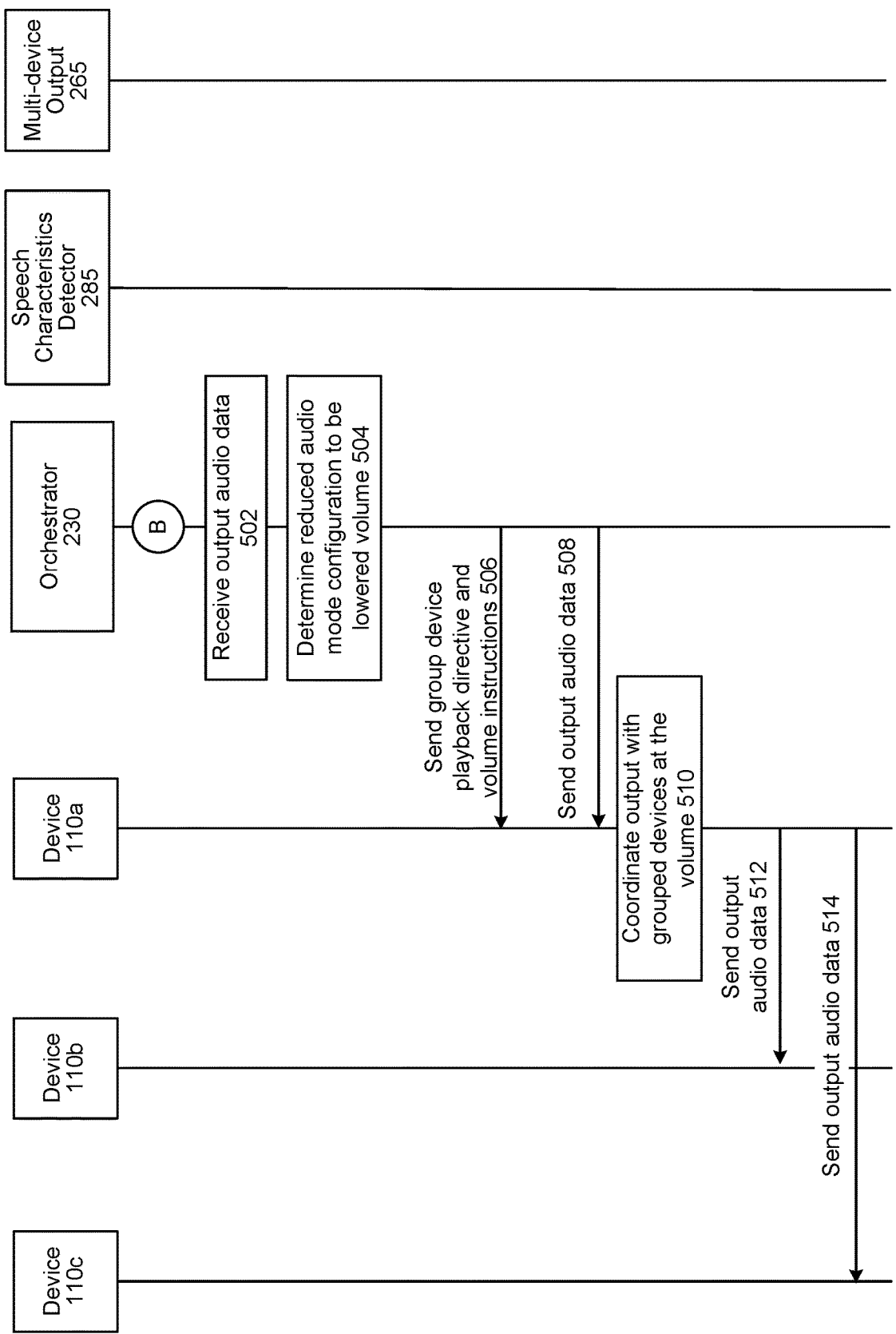
FIG. 5 is a signal flow diagram illustrating how a system may provide output for a multi-device configuration in an alternate output mode according to embodiments of the present disclosure.

Referring to FIG. 5, the orchestrator 230 may receive output audio data (502). In some embodiments, the output audio data may be provided by a skill system(s) 225/component(s) 290 selected by the NLU component 260 to respond to the user input. The orchestrator 230 may determine the whisper mode/alternate output mode configuration for this session (504) to be where output is provided in the group device playback mode but at a lower volume than generally provided. In other words, the orchestrator 230 may determine to output audio at a lower volume in response to determining to operate in whisper mode.

The orchestrator 230 may send a group device playback directive to the first device 110a along with instructions to output at a lower volume (506). The first device 110a may be the master device selected by the multi-device output component 265, may be the device that captured the audio data/user input or detected the non-audio data, or may be the device the orchestrator 230 (or other components of the system(s) 120) determined as the output device. The group playback directive may include device identifiers for the other devices in the group. The volume instructions may indicate a volume level that the first device 110a is to output the audio. In some embodiments, the volume instructions may indicate a percentage by which the first device 110a is to lower output volume.

The orchestrator 230 may send output audio data to the first device 110a (508). The first device 110a, based on the group playback directive, may coordinate output with the group of devices at the specified lower volume (510), and may determine to distribute the output audio data and volume instructions to the other devices in the group. For example, the first device 110a may send the output audio data to the second device 110b (512), along with volume instructions indicating a lower volume level for the output or indicating a percentage by which to lower the output volume. The first device 110a may send the output audio data to the third device 110c (514), along with volume instructions indicating a lower volume level for the output or indicating a percentage by which to lower the output volume. In this manner, the system(s) 120 may enable synchronous output of audio data via multiple devices in a group but at a lower volume per operation in whisper mode.

Figure 6:
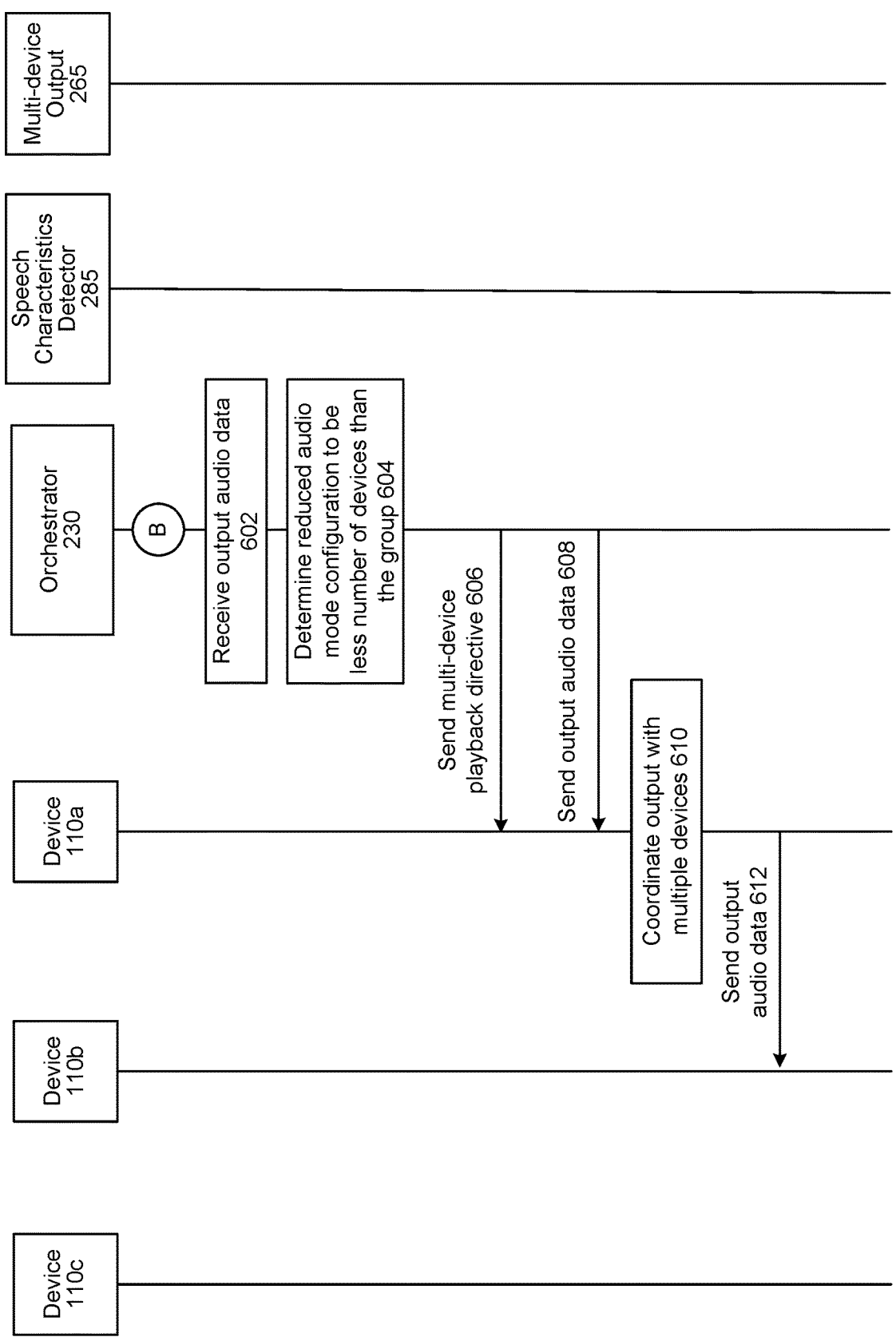
FIG. 6 is a signal flow diagram illustrating how a system may provide output for a multi-device configuration in an alternate output mode according to embodiments of the present disclosure.

Referring to FIG. 6, the orchestrator 230 may receive output audio data (602). In some embodiments, the output audio data may be provided by a skill system(s) 225/component(s) 290 selected by the NLU component 260 to respond to the user input. The orchestrator 230 may determine the whisper mode/alternate output mode configuration for this session (604) to be where output is provided via a subset of the devices in the group. In other words, the orchestrator 230 may determine to provide output via less number of devices than in the group in response to operating in whisper mode.

The orchestrator 230 may send a multi-device playback directive to the first device 110a (606). The multi-device playback directive may include device identifier(s) for the device(s) that is to output the audio in a synchronous manner with the first device. The first device 110a may be the master device selected by the multi-device output component 265, may be the device that captured the audio data/user input or detected the non-audio data, or may be the device the orchestrator 230 (or other components of the system(s) 120) determined as the output device.

The orchestrator 230 may send output audio data to the first device 110a (608). The first device 110a, based on the multi-device playback directive, may coordinate output with at least one other device (610), and may determine to distribute the output audio data to the at least one other device in the group. For example, the first device 110a may send the output audio data to the second device 110b (612) for synchronous output. In this case, the first device 110a may not send output audio data to the other device 110c in the group. In a non-limiting example, in this case, the audio may be outputted via a right stereo speaker and a left stereo speaker, without any output via the subwoofer. In this manner, the system(s) 120 may enable synchronous output of audio data via some of the devices in the group, instead of all the devices in the group, when operating in whisper mode.

In some embodiments, the orchestrator 230 may determine the whisper mode configurations to be synchronous output via a subset of the devices in the group and at a lower volume than generally provided. In some embodiments, the orchestrator 230 may determine the whisper mode configurations to a single device playback mode and at a lower volume than generally provided.

In another non-limiting example, where the group of devices are part of a surround sound system, such as a 5.1 surround or 7.1 surround system, when operating in whisper mode, the system(s) 120 may cause the five/seven full bandwidth channels to provide an output at a lower volume, while stopping output from the low-frequency effects channel. In another non-limiting example, when operating in whisper mode and providing an output via the 5.1/7.1 surround system, the system(s) 120 may cause the right speaker, left speaker and front speakers to provide an output, while stopping output from the rear speakers.

Although FIGS. 1, 3A, 3B, 4A, 4B, 5 and 6 show three devices 110, it should be understood that a group of devices for synchronous output/multi-device output may include two devices 110 or more than three devices 110. The group of devices 110 may be located within the same environment, such as the user's living room, kitchen, bedroom, office, etc.

The output of the system may be an in-kind response. For example, if a user whispers to the system, the system may respond with synthesized speech having a whisper characteristic. The output of the system may not be an in-kind response. For example, if a user shouts to the system, the system may respond with synthesized speech having a whisper characteristic. A system according to the present disclosure is thus configured to provide an intelligent response corresponding to how a human would respond to the user, which may or may not be in-kind.

A single session ID may be associated with a dialog between a single user and the system. A dialog may corresponding to various instances of user input and corresponding system output. One instance of user input and corresponding system output may correspond to one speech characteristic (e.g., whisper) while another instance of user input and corresponding system output may correspond to another speech characteristic (e.g., shout). Thus, a single session ID may include instances of different speech qualities and a speech characteristic of a particular output may be directly tied to only the speech characteristic of the corresponding input. Thus, if a user whispers a first input, the system outputs responsive whispered output, and the user thereafter shouts an input, the system may output responsive shouted output rather than responsive whispered output.

As described above, the orchestrator component 230 may send a speech characteristics indicator to the skill component 290 configured to execute the present user intent. The orchestrator component 230 may determine other speechlet components present executing with respect to the session identifier. For example, a user may speak "play Adele" in normal tone, resulting in Adele music being output at a normal volume. While the Adele music is being output, the user may whisper an input to a user device. In this example, a music speechlet would be a presently executing speechlet. The orchestrator component 230 may send the speech characteristics indicator to the speechlet component configured to execute the whispered input and the presently executing speechlet component. This enables the presently executing speechlet component to reconfigure its present processing. According to the above example, the orchestrator component 230 may send the speech characteristics indicator to the music speechlet component and the music speechlet component may thereafter cause the music, which was being output at a normal volume, to be output in one of the whisper mode configurations for multi-device output (e.g., at a lower volume) described above in relation to FIGS. 4B, 5 and 6.

If the output being provided is synthesized speech, and the output text for the synthesized speech may be received along with metadata, such as speech synthesis markup language (SSML) tags, indicating that a selected portion of the input text should be whispered when output by the TTS component 280. For each unit that corresponds to the selected portion, the TTS component 280 may process the audio data for that unit to create a modified unit audio data. The modified unit audio data may then be concatenated to form the output audio data. The modified unit audio data may also be concatenated with non-modified audio data depending on when the desired whispered speech starts and/or ends. While the modified audio data may be sufficient to imbue the output audio data with the desired audio qualities, other factors may also impact the ultimate output of audio such as playback speed, background effects, or the like, that may be outside the control of the TTS component 280. In that case, other data may be output along with the output audio data representing synthesized speech so an ultimate playback device (e.g., the device 110) receives instructions for playback that can assist in creating the desired output audio. Thus, the other data may include instructions or other data indicating playback device settings (such as volume, playback rate, etc.) or other data indicating how the output audio data should be output. For example, for whispered speech, the output audio data may be associated with other data that may include a prosody tag or other indicator that instructs the device 110 to slow down playback of the output audio data, thus making the ultimate audio sound more like whispered speech, which is typically slower than normal speech. In another example, the other data may include a volume tag that instructs the device 110 to output the speech at a volume level less than a current volume setting of the device 110, thus improving the quiet whisper effect.

For multi-device output, where a group of devices is playing in synchronization, in some embodiments, one of the devices in the group may act as a soft wireless access point for another device in the group. This enables the two devices' audio outputs to be synced. However, when the user gives one of the devices a command to play something else by itself, the device may stop being synchronized with the other device and may instead communicate directly with an access point (e.g., WiFi router) rather than through a soft AP.

A request to form a group of devices for multi-device output may be received based on user input to a device 110. The user input may be received via graphical user interface (GUI) displayed on the device 110. The user input may be received in form of a voice input captured by the device 110. For example, the user input may be "form a group "Everywhere" of all my devices." The system(s) 120 may process the user input and form a device output group identified as "Everywhere" consisting of all devices 110 associated with the user profile. In some embodiments, techniques for synchronizing the output of a group of audio devices include exchange of timestamps between devices using an access point. In other embodiments, a master device may simultaneously transmit timestamps to multiple slave devices using a multicast transmission. The slave devices may then determine differences in the measured times at which the multicast transmission was received to synchronize the slave devices with one another. To avoid inaccuracies in the timestamp associated with the multicast transmission by the master device, a slave device may exchange timestamps with the master device using a unicast or multicast transmission to synchronize the master device relative to the slave device. Multiple groups of devices that are synchronized in this manner may be synchronized with one another by exchanging timestamps via an access point.

Figure 7:
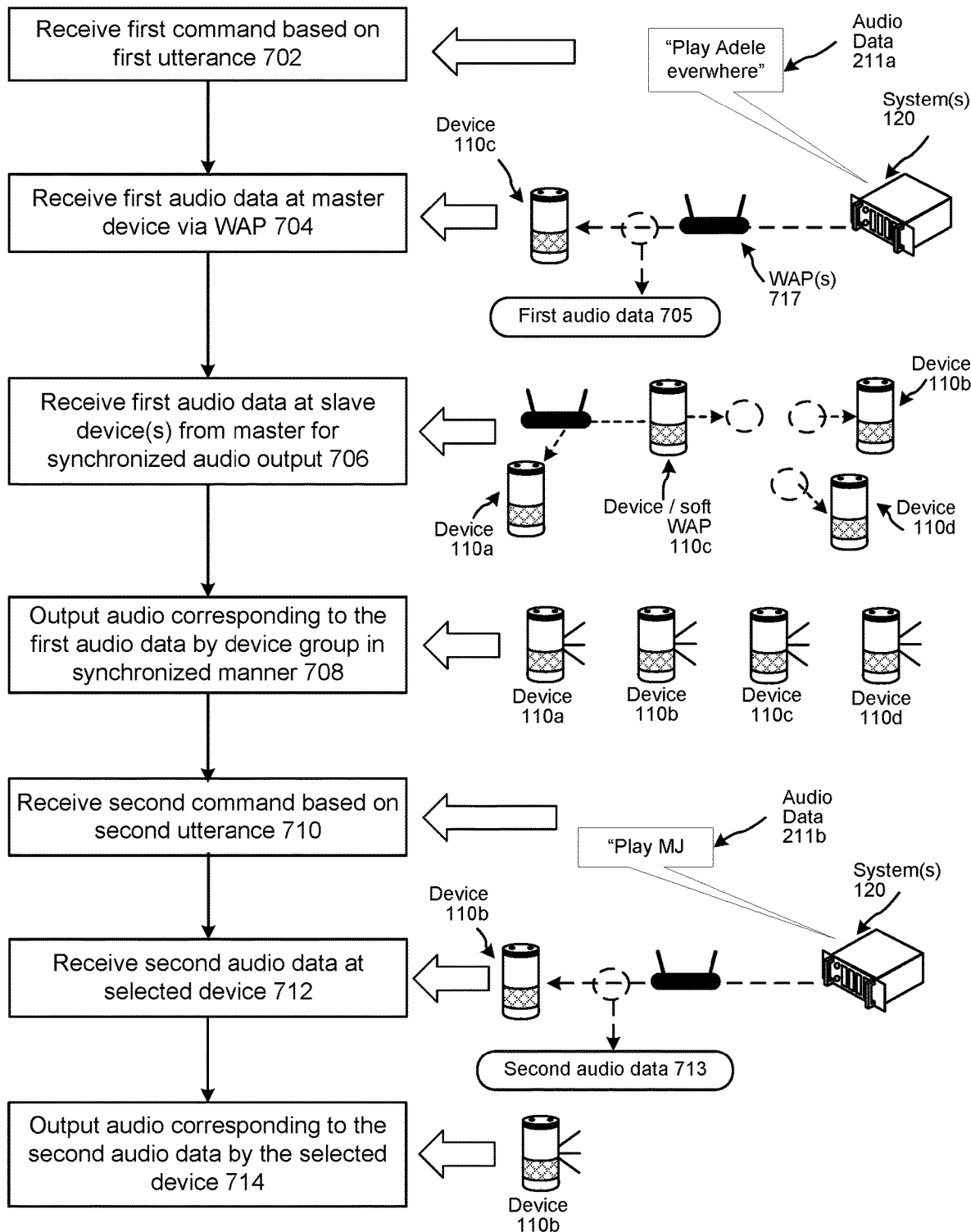
FIG. 7 is a conceptual diagram illustrating a process for dynamically switching between operating in a group mode and an individual mode for audio output according to embodiments of the present disclosure.

FIG. 7 is a conceptual diagram illustrating a process for dynamically switching between operating in a group mode and an individual mode for audio output according to embodiments of the present disclosure. At 702, a first command can be received by a device 110 based at least in part on receiving a first utterance in a user 5 environment. For example, the user 5 may utter the voice command "Play Adele Everywhere", and the microphone of device 110c, may generate audio data 211a corresponding to the utterance, and may transmit the audio data 211a to the system(s) 120 for processing the voice command. The system(s) 120 can perform the various ASR and NLU techniques described above to generate a first command, which may be specific to a music domain or service. The components of the system(s) 120 involved with processing the speech from the user 5 and generating the first command may be unaware of the intended target of the command. For example, the intended target on which the user 5 would like to play music from may be a device output group called "Everywhere." Accordingly, the ASR and NLU components of the system(s) 120 may process the audio data 211a to determine that Everywhere corresponds to a target for output of audio data, but these components may not know whether "Everywhere" corresponds to a single device 110c or multiple devices 110. The orchestrator 230 may communicate with the multi-device output component 265 to determine, that "Everywhere" corresponds to a device output group comprising multiple devices 110. The multi-device output component 265, having determined the devices 110 that are members of the "Everywhere" group, can then select a master receiver device 110 that is to receive the first command. Thus, the first command can be received by a device 110 that corresponds to the master receiver at block 702.

The master receiver may be a different device 110 than the audio distribution master device (e.g., device 110c in the above example). In this scenario, the master receiver forwards the command to the audio distribution master, the first command instructing the audio distribution master to obtain an audio file associated with the artist "Adele" for initiating synchronized audio playback of the audio file via the device output group named "Everywhere." In some embodiments, the first command may include an audio playback operation, a first content identifier corresponding to a song by the artist Adele, and a target identifier associated with the Everywhere group comprising devices 110a-110d. The master receiver may forward the command to the audio distribution master based on the presence of the target identifier associated with the Everywhere group in the command. The target identifier informs the master receiver that the devices in the Everywhere group are to be placed in "group mode" for playback of audio in a synchronized manner via the Everywhere group.

The device 110c, being the audio distribution master device of the "Everywhere" group, receives the command (either directly from the system(s) 120 at block 702 when it is the master receiver, or otherwise forwarded from the master receiver). The command may instruct the audio distribution master to retrieve a first audio file 705 from a content source. At 704, the audio distribution master receives (e.g., by following the link in the first command) a first audio file 705 from a content source and via a wireless access point (WAP) 717 in the user's environment. The audio file 705 corresponds to a content identifier in the first command. The first content identifier in the first command may be a link (e.g., a Uniform Resource Locator (URL)) pointing to the content source where the audio file 705 is to be obtained, and the audio distribution master device 110c may use the link to retrieve the audio file 705.

At 706, one or more slaves in the group of devices that are to engage in synchronized audio playback of the audio file 705 receive the first audio file 705 from the audio distribution master device (e.g., device 110c). As shown in the pictorial diagram next to block 706 of FIG. 7, utilization of a hybrid topology, may cause individual slaves to receive the first audio file 705 from the audio distribution master (e.g., device 110c) via the WAP 717. This is the case with the slave device 110a, which is connected to device 110c (the audio distribution master device) via the WAP 717. For individual slave devices, such as slave devices 110b and 110d, which are directly connected to the audio distribution master (e.g., device 110*c*) acting as a soft WAP, those slave devices 110*b* and 110*d* receive the first audio file 705 directly from the audio distribution master device in the form of a multicast packet, which is not transmitted via the WAP 717.

At 708, the devices 110 in the "Everywhere" group, which now possess the first audio file 705, can output audio of the first audio file 705 in a synchronized manner. Before continuing with the remaining blocks of the process, a brief description of synchronized output of audio, such as that which can take place at block 708, is described.

In general, the audio playback devices 110 described herein are configured to output audio in a synchronized manner; "synchronized" meaning substantially synchronized in the sense that audio output between two audio playback devices 110 cannot be out of synch by more than a threshold amount of drift (due to respective local clocks running at different frequencies) that is known to be perceptible to the human ear. When devices 110 are situated in different rooms of a house, a threshold drift of about 5000 microseconds or greater may be perceptible to the human ear, while a threshold drift of 150 microseconds or greater may be perceptible to the human ear when at least two devices 110 are situated in the same room. Thus, synchronized output of audio, as used herein, can mean substantially synchronized in the sense that audio of the same audio file can start playback at respective devices 110 at substantially the same time (e.g., within milliseconds or microseconds of each other), and the relative time offsets between the devices' 110 local clocks can drift over the course of audio playback up to a predetermined amount in order to be considered as maintaining "synchronicity". By maintaining synchronicity in this manner, an echo effect due to slight deviations in timing between respective devices 110 can be minimized, and often eliminated.

Synchronized output of audio begins with audio distribution. For instance, all of the devices 110 in a device output group can receive the same audio file. A streaming protocol can be implemented that allows an audio distribution master device to send messages to slave devices instructing the slaves to "play this audio file at this time." The audio distribution master device can be responsible for coordinating audio distribution from the content source(s)/skill systems 225 to the slave devices 110.

The device 110 may optionally include an audio pipeline and an optional time synch module. The audio pipeline can comprise a media player configured to receive audio data (e.g., audio files) from the content source(s)/skill system(s) 225 via the system(s) 120, and to decode an incoming audio stream. The audio pipeline can further include a mixer that creates a single audio stream from mixed audio, such as a TTS response mixed with a music audio file, and an output path providing audio output processing, such as EQ, and the like.

The time synch module is configured to synchronize time between the device 110 and one or more other devices 110 in a device output group. The time synch protocol may run separate from the rest of the audio system, and keeps the audio pipeline clocks of all grouped devices 110 in sync. One device 110 can act as a time master (typically a different device as the audio distribution master). The time master exchanges timestamp information with slaves so that all slave devices can calculate and correct the time differences (Skew, drift=dSkew/dt) between themselves and the time master. Time synchronization establishes a common time base between the master device and the slaves. The devices 110 have their own crystal oscillators that run at slightly different frequencies. For example, the crystals on respective devices 110 can be off by 20 PPM slow or fast (e.g., 20 us per second). Two devices can therefore differ by up to 40 PPM. If this 40 PPM is not corrected, the phase coherence between speakers will be off by more than 150 us in only 4 seconds, and will be off by more than 5 ms in about 2 minutes.

Therefore, the relative offset between clocks (skew) and the relative change in skew over time (drift) can be measured and use to resample audio rates to match the master device's audio playback rate, thereby correcting the differences between respective device 110 clocks. A timestamp exchange technique can be used for measuring skew and drift across clocks of different audio playback devices 110. The time master device can take a first timestamp and send it to a slave device, and in response to the first timestamp's arrival at the slave device, the slave device can take a second timestamp and send it to the time master device. In response to the second timestamp arriving at the time master device, the time master can take a third timestamp. Other methods can also be used, such as user datagram protocol (UDP) broadcast techniques where timestamps are taken on both the time master (outgoing) side and the slave (incoming) side, while also attempting to minimize the time-in-flight from master to slave. Another possible technique is to use a high-resolution timing register in Wi-Fi beacon packet to synchronize devices (e.g., synchronizing to the WAP's 717 Wi-Fi beacon, or synchronizing to the designated soft WAP's Wi-Fi beacon while the soft WAP (i.e., master device) syncs to one slave device using the above-mentioned timestamp exchange technique, etc.).

Synchronized output of audio also involves audio placement, where each device 110 determines a length of time that an audio file will be processed through the audio pipeline before it is actually output as audio via the speaker 1012. This is because one device 110 may process audio data through its local audio pipeline in a different amount of time than the next device 110. Thus, by determining this length of time, the device 110 can determine when an audio file is to be pushed to the beginning of the audio pipeline so that the audio corresponding to the audio file will be output at substantially the same time as the output of audio on the other device(s) 110 in the device output group. "Substantially the same time" here means output of audio from multiple devices 110 in the group begins within a particular time period, such as 5 ms.

Continuing with reference again to FIG. 7, at block 710, a second command can be received by an audio playback device 110 (e.g., device 110*b*) based at least in part on a second utterance in the user 5 environment. For example, the user 5 may utter the voice command "Play MJ", and the microphone 1020 of device 110*d*, may generate audio data 211*b* based on the input audio corresponding to the utterance, and may transmit the audio data 211*b* to the system(s) 120 for processing the voice command. The system(s) 120 can perform the various ASR and NLU techniques described above to generate the second command, which may be specific to a music domain or service, and the second command can be received by a device 110. As described above, the system(s) 120 may process the audio data 211*b* to determine certain speech characteristics (for example, using the speech characteristic detector 285). In an example case, the system(s) 120 may determine that the second command corresponds to whispered speech; that is the user 5 whispered "Play MJ." In this case, the system(s) 120 may determine to operate in a single/individual device playback mode rather than a group device playback mode.

The system(s) 120 may determine which of the devices 110 is the target output device for responding to the second command. In some cases, the device 110b that received the second command may be the target output device. In other cases, another device 110 may be the target output device. The system(s) 120 may determine the target output device based on the content of the output, the output type, user presence data, device capabilities, and other information. If the device/master receiver that received the second command is different than the target device (e.g., device 110b in this example), the master receiver can forward the command to the target device 110b. The second command may instruct device 110b (the target device) to obtain an audio file associated with the artist "MJ" (Michael Jackson) for initiating synchronized audio playback of the audio file via the device 110b in individual mode. In some embodiments, the second command may include an audio playback operation, a second content identifier corresponding to a song by the artist MJ, and a target identifier associated with the entity specified in the user's 5 voice command (e.g., device 110b in the above example). This tells the master receiver and the target device (e.g., device 110b) that device 110b should be placed into "individual mode" for playback of audio by device 110b in isolation.

At 712, device 110b, being the target device on which the audio file is to be output, receives a second audio file 713 that was ultimately obtained from the content source/skill system 225 via the WAP 717. The audio file 713 corresponds to the content identifier in the second command. The second content identifier in the second command may be a link (e.g., a URL) pointing to the content source/skill system 225 where the audio file 713 is to be obtained, and the target device 110b may use the link to retrieve the audio file 713.

At 714, audio of the second audio file 713 can be output by the target device 110b. Notably, although device 110b, while in group mode, is configured to receive audio data directly from the audio distribution master acting as a soft WAP, device 110b is nonetheless instructed by the second command received at 710 to operate in individual mode and to dynamically switch from receiving audio data directly from the master device, to receiving audio data via the WAP 717 in the environment. By contrast, if device 110b were to remain in the "soft WAP" configuration where it receives audio data directly from the audio distribution master device, the audio distribution master would have to retrieve the second audio file 713 and send the audio file 713 directly to the slave device 110b for output of audio on the device 110b. This is inefficient from a networking bandwidth standpoint, especially considering a possible scenario where many slave devices 110 in a group are switched to individual mode and all of them are trying to access audio data directly from the audio distribution master acting as the soft WAP. Instead, the process allows these slave devices 110 to dynamically switch to receiving audio data via the WAP 717 in the environment when they are to operate in individual mode, having previously operated in group mode.

Figure 8:
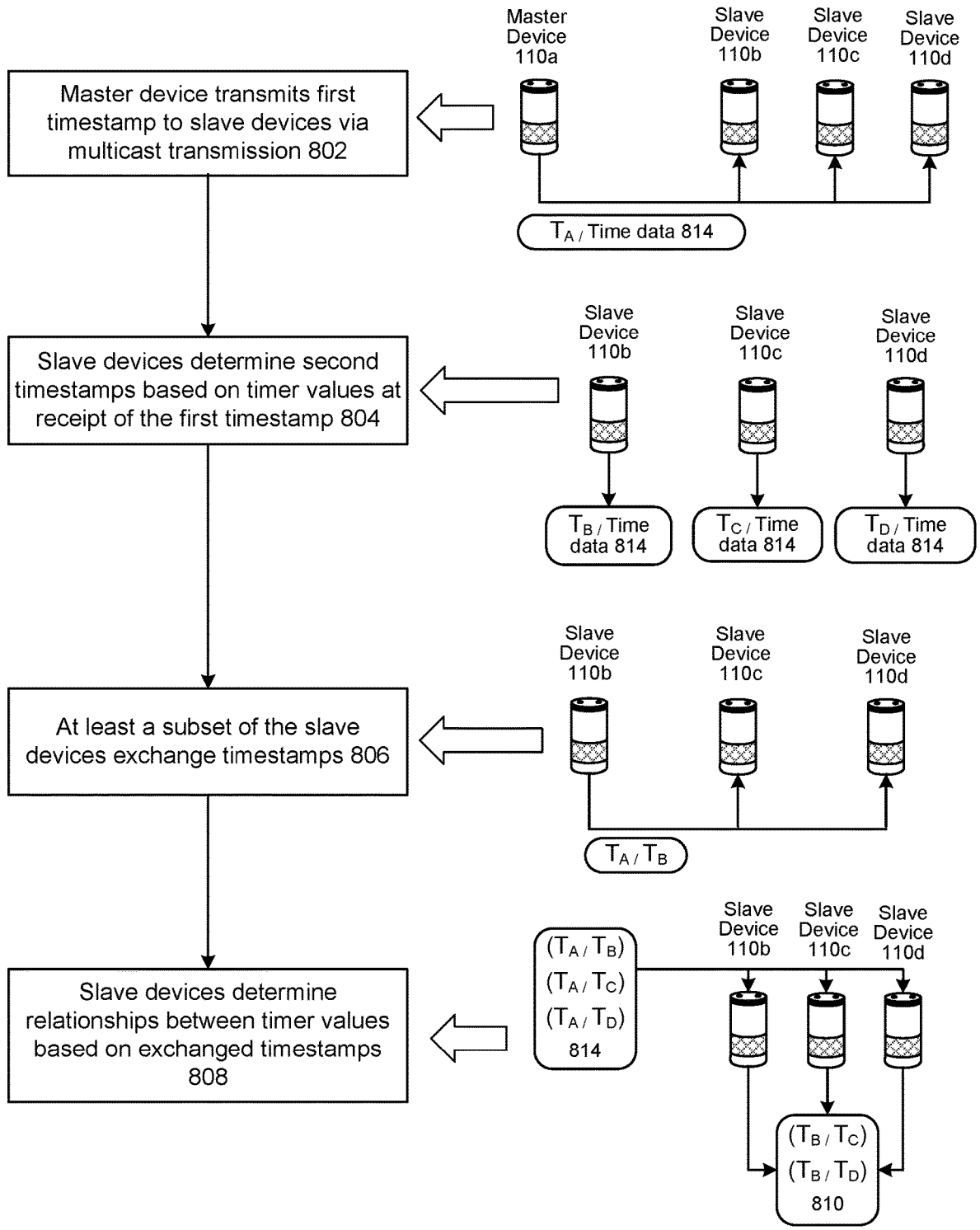
FIG. 8 is a conceptual diagram illustrating a process for synchronizing a group of devices for audio output according to embodiments of the present disclosure.

FIG. 8 is a conceptual diagram illustrating a process for synchronizing a group of devices for audio output according to embodiments of the present disclosure. FIG. 8 illustrates an example process for synchronizing a group of audio devices. At 802, a master device may transmit a first timestamp to one or more slave devices 110 via a multicast transmission. For example, a distribution master device 110a configured to transmit audio data to multiple slave devices 110 via one or more multicast transmissions may transmit time data 814 to the slave devices 110. The time data 814 may include a timestamp indicative of a timer value for the distribution master device 110a at the time that the time data 814 was transmitted.

At 804, the slave devices 110b, 110c, 110d may determine second timestamps based on the timer values of the respective slave devices 110 at the time that the first timestamp was received from the distribution master device 110a. For example, each slave device 110 may include a clock or other type of timer device. The timer device for each slave device 110 may indicate a different timer value based on the time at which each respective slave device 110 was activated and the characteristics of the timer device, such as the type or frequency of crystal or other components thereof. Each slave device 110 may therefore determine a respective timestamp based on the respective timer value of that slave device 110 at the time that the time data 814 was received. For example, FIG. 8 depicts a first slave device 110b determining second time data 814 indicative of a timestamp "$T_B$", a second slave device 110c determining third time data 814 indicative of a timestamp "$T_C$", and a third slave device 110d determining fourth time data 814 indicative of a timestamp "$T_D$".

At 806, at least a subset of the slave devices 110 may exchange one or more determined timestamps. For example, upon receipt of the first timestamp from the master device, a slave device 110 determine a second timestamp based on a current timer value at the time the first timestamp was received, then store the first and second timestamps as an ordered pair having the format "$(T_A,T_B)$". To synchronize the slave devices 110 relative to at least one audio device (e.g., the local synchronization master device 110a), at least one of the slave devices 110 may provide the determined timestamps to each other slave device 110. For example, FIG. 8 depicts a first slave device 110b providing a set of timestamps "$(T_A,T_B)$" to the other slave devices 110. By providing the set of timestamps to each of the other slave devices 110, the other slave devices 110 can determine relationships between the respective timer values of the other slave devices 110 and the timer value of the slave device 110 that provided the timestamps, enabling the slave device 110 that provided the timestamps to function as the local synchronization master device 110a. In other implementations, other slave devices 110, such as the second slave device 110c or the third slave device 110d may provide sets of timestamps (e.g., "$(T_A,T_B)$" or "$(T_A,T_D)$" to one or more other slave devices 110). In some implementations, slave devices 110 may provide time data 814 to other slave devices 110 via one or more unicast transmissions. In other implementations, slave devices 110 may provide time data 814 to other slave devices 110, and in some implementations to the distribution master device 110a. In still other implementations, slave devices 110 may provide time data 814 to other slave devices 110 via communication links with one or more access points. In other implementations, slave devices 110 may provide time data 814 to the distribution master device 110a. The distribution master device 110a may, in turn, transmit the received time data 814 to each of the slave devices 110 via one or more multicast transmissions or one or more unicast transmissions.

At 808, the slave devices 110 may determine relationships between their respective timer values based on the exchanged timestamps. For example, after receiving timestamps from the slave device 110b, having the format of an ordered pair indicating the first timestamp and the second timestamp (e.g., "$(T_A,T_B)$"), other slave devices 110 may store the received timestamps and the time data 814 based on receipt of the first time data 814 in a table or similar data structure. By performing a join operation or similar function using the first timestamp ("$T_A$") as a key value, a slave device 110 may determine offset data 810 indicating the relationships between the timestamps of the slave devices 110. For example, because each slave device 110 received the first timestamp form the distribution master device 110a as part of a simultaneous event (e.g., a multicast transmission), the difference between the timer values of the slave devices 110 at the time that the first timestamp was received may be used to determine offsets or delays to synchronize the output of content. In some implementations, the offset data 810 may include ordered pairs of timestamps for respective pairs of slave devices 110 (e.g., "($T_B,T_C$)" and "($T_B, T_D$)"). The offset data 810 may be used to synchronize the slave devices 110 relative to one another, such as by determining an offset between each slave device 110 and the local synchronization master device 110a.

In another example process for synchronizing a group of audio devices the distribution master device 110 may be used to synchronize with one or more of the slave devices. A slave device 110 may transmit a request for a timestamp to the master device 110a. For example, a particular slave device 110 may provide a request to the distribution master device 110 via a unicast transmission. In other embodiments, the slave device 110 may provide the request via a multicast transmission or via a communication link with one or more access points.

The slave device 110 that provided the request may determine a first timestamp indicative of a timer value at the time that the request was transmitted. The master device 110 may determine a second timestamp based on the timer value at the time that the master device received the request from the slave device 110. The master device 110 may transmit the second timestamp to the slave device 110 that provided the request. In other embodiments, the distribution master device 110 may provide the second time data to the slave device 110 via one or more multicast transmissions or via a communication link with one or more access points. The slave device 110 may determine a third timestamp at the time that the second timestamp was received from the distribution master device 110. In some embodiments, the timestamps received and determined by the slave device 110 may be expressed as an ordered triplet indicating the first timestamp determined by the slave device 110, the timestamp received from the distribution master device 110, and the second timestamp determined by the slave device 110 (e.g., "($T_{B1}, T_A, T_{B2}$)"), which may be referred to as offset data 810. Based on the first, second, and third timestamps, the slave device 110 may determine a relationship between the timer value of the slave device 110 and that of the distribution master device 110. In some implementations, one or more of the first, second, or third timestamps may be provided to one or more of the other slave devices 110. The master device and the slave devices may be synchronized using the offset data 810.

In some embodiments, the audio devices may be configured to determine offset data 810 periodically or continuously. For example, after determining multiple sets of timestamps over a period of time, the distribution master device 110 may transmit multiple sets of timestamps, such as via a bulk or batch process, to the slave devices 110.

In some embodiments, a technique for synchronizing audio (e.g., playing audio samples at exactly the correct time) may involve determining a delay between when an audio sample is sent to a wireless speaker and when the audio sample is output by the speaker. For example, a first processor may send audio data to a speaker at a first time, the audio data including an audio test signal (for example a first sample having a maximum positive value and a second sample having a maximum negative value), followed by samples of silence (frames having values of zero). A second processor at the speaker may detect the audio test signal by detecting that a sample is saturated in the positive or negative direction, which normally does not happen. After detecting the saturated signal, the second processor may take a timestamp at a second time and may send the timestamp back to the first processor. Based on the timestamp, the first processor may calculate how many samples of silence were sent to the speaker between the first time (such as sending the audio test signal to the speaker) and the second time (such as the speaker receiving the audio test signal) and determine a corresponding playback delay.

In some embodiments, a technique for synchronizing audio (e.g., playing audio samples at exactly the correct time) may involve determining a delay between when an audio sample is sent to a wireless speaker and when the audio sample is output by the speaker. For example, a first processor may send audio data to a speaker at a first time, the audio data including an audio test signal (for example a first sample having a maximum positive value and a second sample having a maximum negative value), followed by samples of silence (frames having values of zero). A second processor at the speaker may detect the audio test signal by detecting that a sample is saturated in the positive or negative direction, which normally does not happen. After detecting the saturated signal, the second processor may take a timestamp at a second time and may send the timestamp back to the first processor. Based on the timestamp, the first processor may calculate how many samples of silence were sent to the speaker between the first time (such as sending the audio test signal to the speaker) and the second time (such as the speaker receiving the audio test signal) and determine a corresponding playback delay.

Figure 9:
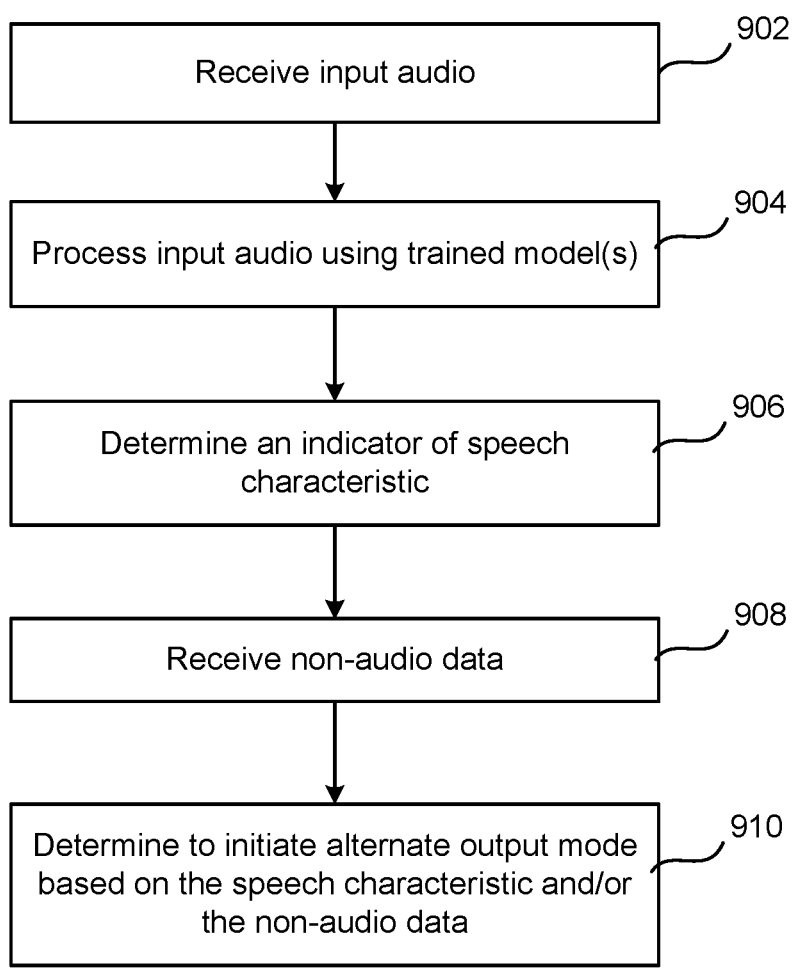
FIG. 9 is a flowchart illustrating a process for determining to initiate an alternate output mode based on speech characteristics according to embodiments of the present disclosure.

FIG. 9 illustrates a flow diagram describing operation of the speech characteristic detector 285 according to various embodiments. The speech characteristic detector 285 may receive (902) input audio (e.g., audio 11/audio data 211), which may represent an utterance/speech from the user 5. The speech characteristic detector 285 may process (904) the input audio using one or more trained model(s). The speech characteristic detector 285 may determine (906) an indicator of speech characteristic as described in detail above with respect to FIG. 2. The speech characteristic detector 285 may receive (908) non-audio data, such as, time/date data, location data, ambient light data, the identity of nearby individuals to the user 5, proximity of the user to the device 110, etc. The speech characteristic detector 285 may determine (910) to initiate an alternate output mode based on the speech characteristic indicator and/or the non-audio data, where the alternate output mode may modify how existing output via multiple devices is presented to the user or may present output in a manner different than a usual/stored multi-device synchronous output. The system(s) 120 may determine to initiate an alternate output mode in response to receiving input audio from a user while output is being presented via multi-device synchronization. The system(s) 120 may determine to respond to the user input/utterance using an alternate output mode.

Figure 10:
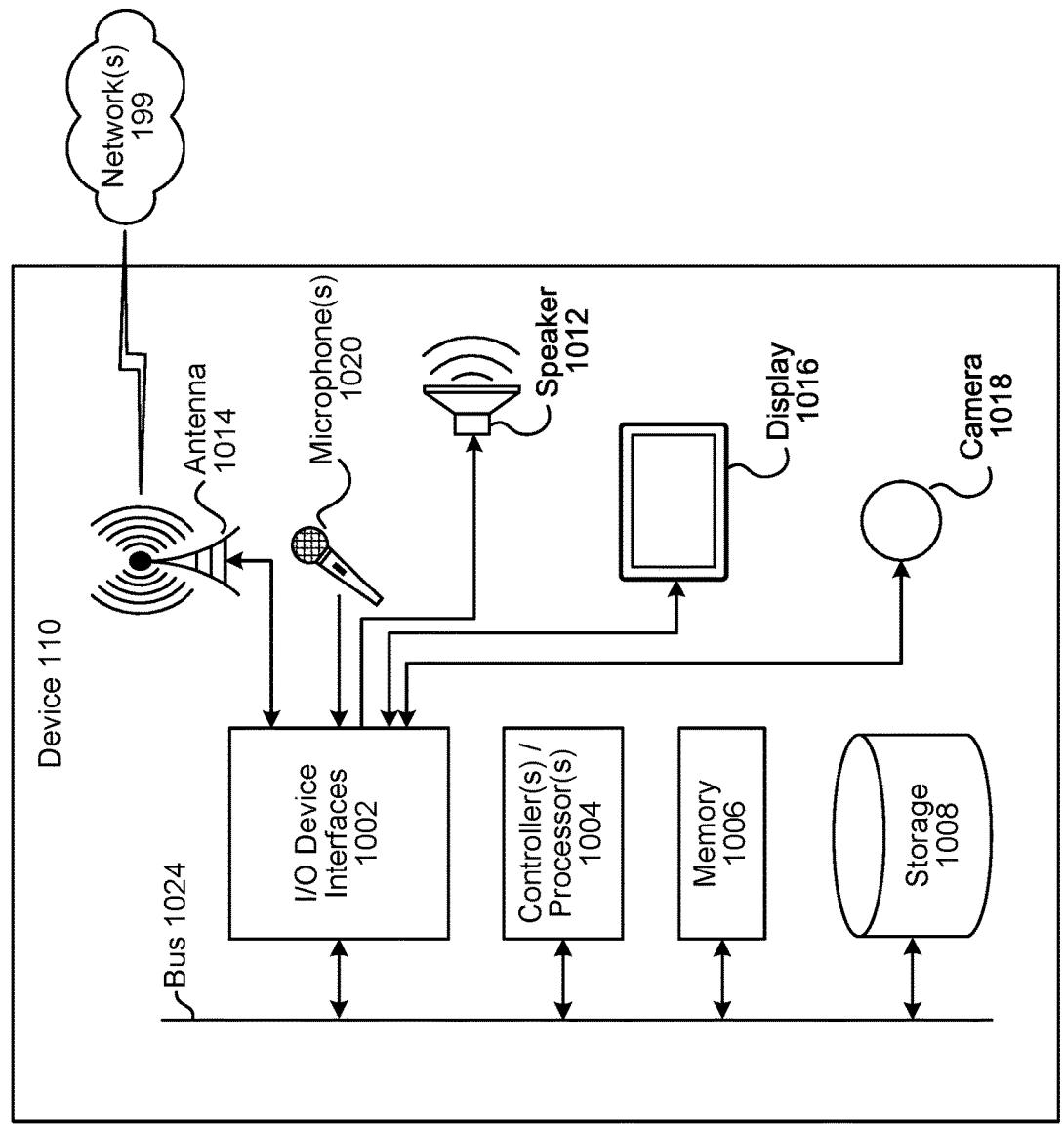
FIG. 10 is a block diagram conceptually illustrating example components of a device according to embodiments of the present disclosure.
Figure 11:
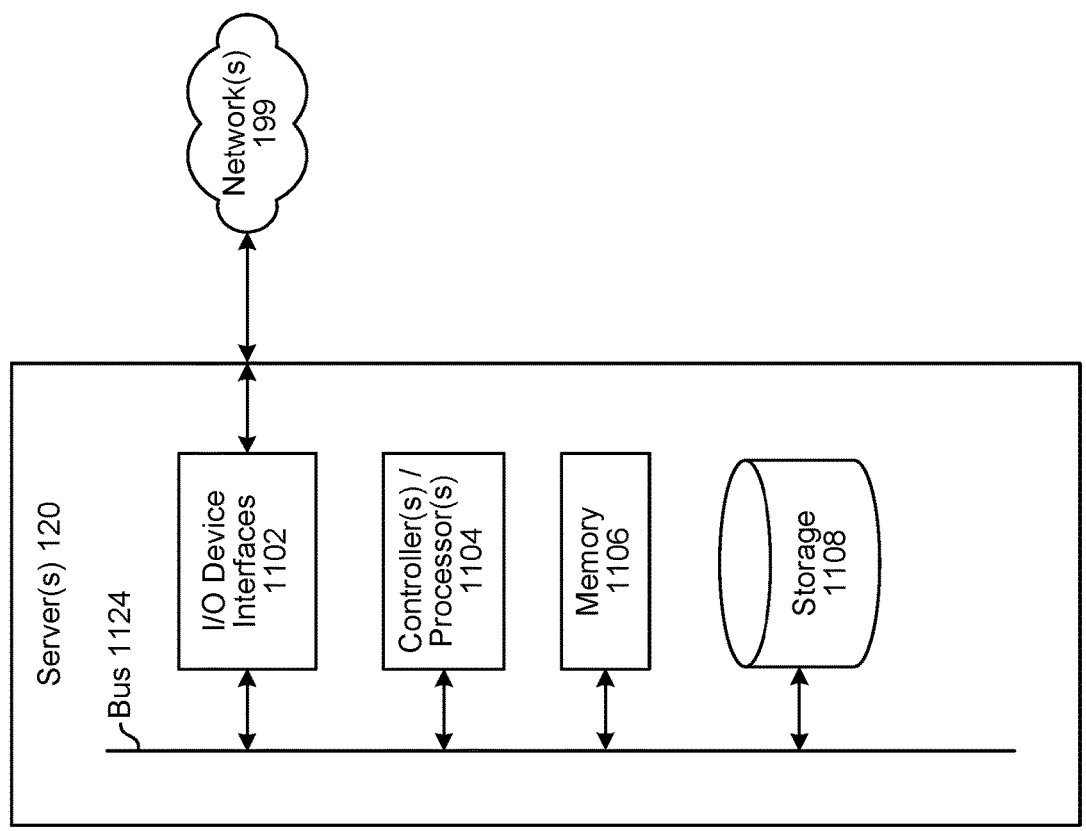
FIG. 11 is a block diagram conceptually illustrating example components of a server according to embodiments of the present disclosure.

FIG. 10 is a block diagram conceptually illustrating a device 110 that may be used with the system. FIG. 11 is a block diagram conceptually illustrating example components of a remote device, such as the natural language processing system(s) 120, which may assist with ASR processing, NLU processing, etc.; and a skill system(s) 225. A system (120/225) may include one or more servers. A "server" as used herein may refer to a traditional server as understood in a server/client computing structure but may also refer to a number of different computing components that may assist with the operations discussed herein. For example, a server may include one or more physical computing components (such as a rack server) that are connected to other devices/components either physically and/or over a network and is capable of performing computing operations. A server may also include one or more virtual machines that emulates a computer system and is run on one or across multiple devices. A server may also include other combinations of hardware, software, firmware, or the like to perform operations discussed herein. The system(s) 120 may be configured to operate using one or more of a client-server model, a computer bureau model, grid computing techniques, fog computing techniques, mainframe techniques, utility computing techniques, a peer-to-peer model, sandbox techniques, or other computing techniques.

Multiple systems (120/225) may be included in the overall system of the present disclosure, such as one or more natural language processing systems 120 for performing ASR processing, one or more natural language processing systems 120 for performing NLU processing, one or more skill systems 225, one or more content providers, etc. In operation, each of these systems may include computer-readable and computer-executable instructions that reside on the respective device (120/225), as will be discussed further below.

Each of these devices (110/120/225) may include one or more controllers/processors (1004/1104), which may each include a central processing unit (CPU) for processing data and computer-readable instructions, and a memory (1006/1106) for storing data and instructions of the respective device. The memories (1006/1106) may individually include volatile random access memory (RAM), non-volatile read only memory (ROM), non-volatile magnetoresistive memory (MRAM), and/or other types of memory. Each device (110/120) may also include a data storage component (1008/1108) for storing data and controller/processor-executable instructions. Each data storage component (1008/1108) may individually include one or more non-volatile storage types such as magnetic storage, optical storage, solid-state storage, etc. Each device (110/120/225) may also be connected to removable or external non-volatile memory and/or storage (such as a removable memory card, memory key drive, networked storage, etc.) through respective input/output device interfaces (1002/1102).

Computer instructions for operating each device (110/120/225) and its various components may be executed by the respective device's controller(s)/processor(s) (1004/1104), using the memory (1006/1106) as temporary "working" storage at runtime. A device's computer instructions may be stored in a non-transitory manner in non-volatile memory (1006/1106), storage (1008/1108), or an external device(s). Alternatively, some or all of the executable instructions may be embedded in hardware or firmware on the respective device in addition to or instead of software.

Each device (110/120) includes input/output device interfaces (1002/1102). A variety of components may be connected through the input/output device interfaces (1002/1102), as will be discussed further below. Additionally, each device (110/120) may include an address/data bus (1024/1124) for conveying data among components of the respective device. Each component within a device (110/120) may also be directly connected to other components in addition to (or instead of) being connected to other components across the bus (1024/1124).

Referring to FIG. 10, the device 110 may include input/output device interfaces 1002 that connect to a variety of components such as an audio output component such as a speaker 1012, a wired headset or a wireless headset (not illustrated), or other component capable of outputting audio. The device 110 may also include an audio capture component. The audio capture component may be, for example, a microphone 1020 or array of microphones, a wired headset or a wireless headset (not illustrated), etc. If an array of microphones is included, approximate distance to a sound's point of origin may be determined by acoustic localization based on time and amplitude differences between sounds captured by different microphones of the array. The device 110 may additionally include a display 1016 for displaying content. The device 110 may further include a camera 1018.

Via antenna(s) 1014, the input/output device interfaces 1002 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, 4G network, 5G network, etc. A wired connection such as Ethernet may also be supported. Through the network(s) 199, the system may be distributed across a networked environment. The I/O device interface (1002/1102) may also include communication components that allow data to be exchanged between devices such as different physical servers in a collection of servers or other components.

The components of the device(s) 110 and the system(s) 120 may include their own dedicated processors, memory, and/or storage. Alternatively, one or more of the components of the device(s) 110 and the system(s) 120 may utilize the I/O interfaces (1002/1102), processor(s) (1004/1104), memory (1006/1106), and/or storage (1008/1108) of the device(s) 110 and system(s) 120, respectively. Thus, the ASR component 250 may have its own I/O interface(s), processor(s), memory, and/or storage; the NLU component 260 may have its own I/O interface(s), processor(s), memory, and/or storage; and so forth for the various components discussed herein.

As noted above, multiple devices may be employed in a single system. In such a multi-device system, each of the devices may include different components for performing different aspects of the system's processing. The multiple devices may include overlapping components. The components of the device 110 and the system(s) 120, as described herein, are illustrative, and may be located as a stand-alone device or may be included, in whole or in part, as a component of a larger device or system.

Figure 12:
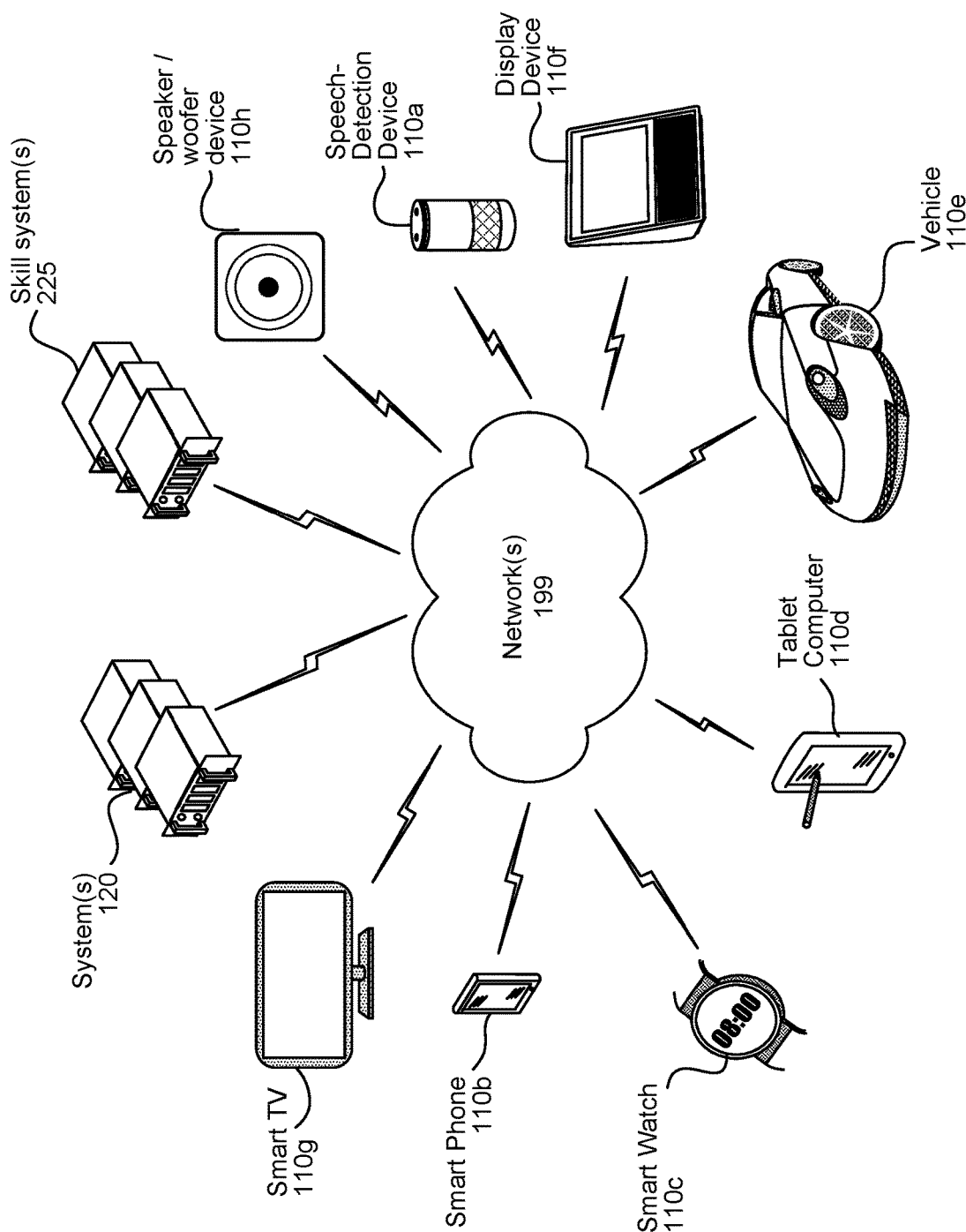
FIG. 12 illustrates an example of a computer network for use with a speech processing system.

As illustrated in FIG. 12, multiple devices (110a-110g, 120, 225) may contain components of the system and the devices may be connected over a network(s) 199. The network(s) 199 may include a local or private network or may include a wide network such as the Internet. Devices may be connected to the network(s) 199 through either wired or wireless connections. For example, a speech-detection device 110a, a smart phone 110b, a smart watch 110c, a tablet computer 110d, a vehicle 110e, a display device 110f, a smart television 110g and/or a speaker/woofer/subwoofer device 110h may be connected to the network(s) 199 through a wireless service provider, over a WiFi or cellular network connection, or the like. Other devices are included as network-connected support devices, such as the system(s) 120, the speechlet server(s) 225, and/or others. The support devices may connect to the network(s) 199 through a wired connection or wireless connection. The networked devices 110 may capture audio using one-or-more built-in or connected microphones or other audio capture devices, with processing performed by ASR components, NLU components, or other components of the same device or another device connected via the network(s) 199, such as the ASR component 250, the NLU component 260, etc. of one or more servers 120. One or more of the networked devices 110 may also capture non-audio data (e.g., gestures, light intensity via a light sensor, video/image data, etc.) that the system(s) 120 may use to determine to initiate an alternate output mode for a particular session.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage medium may be implemented by a volatile computer memory, non-volatile computer memory, hard drive, solid-state memory, flash drive, removable disk, and/or other media. In addition, components of system may be implemented as in firmware or hardware, such as an acoustic front end (AFE), which comprises, among other things, analog and/or digital filters (e.g., filters configured as firmware to a digital signal processor (DSP)).

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements, and/or steps are in any way required for one or more embodiments or that one or more embodiments necessarily include logic for deciding, with or without other input or prompting, whether these features, elements, and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method, comprising:
receiving input audio data representing an utterance, wherein the input audio data corresponds to a first device configured to operate in a first mode corresponding to coordinated audio output with a second device;
performing speech processing using the input audio data to determine output data responsive to the utterance; and
based at least in part on the speech processing, sending first data causing at least one of the first device or the second device to operate in a second mode corresponding to discontinuation of coordinated audio output.

2. The computer-implemented method of claim 1, further comprising:
determining second data representing a semantic interpretation of the utterance,
wherein sending the first data is based at least in part on the semantic interpretation.

3. The computer-implemented method of claim 1, further comprising:
prior to receiving the input audio data, causing coordinated music playback using the first device and the second device; and
after sending the first data, causing further music playback using the first device and not the second device.

4. The computer-implemented method of claim 1, wherein sending the first data is based at least in part on the output data.

5. The computer-implemented method of claim 1, further comprising:
determining first configuration data corresponding to the first device and the second device belonging to a group corresponding to the coordinated audio output; and
substituting the first configuration data with second configuration data corresponding to removal of the first device from the group.

6. The computer-implemented method of claim 1, further comprising:
after sending the first data, causing the first device to present the output data; and
after presentation of the output data, sending second data causing the first device to resume the first mode corresponding to coordinated audio output with the second device.

7. The computer-implemented method of claim 1, further comprising:
based at least in part on the speech processing, sending second data causing the first device to lower an output volume setting.

8. The computer-implemented method of claim 1, further comprising:
determining user preference data corresponding to the utterance, wherein sending the first data is further based at least in part on the user preference data.

9. The computer-implemented method of claim 1, further comprising:
receiving sensor data corresponding to an environment of the utterance,
wherein sending the first data is further based at least in part on the sensor data.

10. The computer-implemented method of claim 1, further comprising:
based at least in part on the input audio data, sending second data causing at least one of the first device or the second device to operate in a do not disturb mode.

11. A system comprising:
at least one processor; and
at least one memory comprising instructions that, when executed by the at least one processor, cause the system to:
receive input audio data representing an utterance, wherein the input audio data corresponds to a first device configured to operate in a first mode corresponding to coordinated audio output with a second device;
perform speech processing using the input audio data to determine output data responsive to the utterance; and
based at least in part on the speech processing, send first data causing at least one of the first device or the second device to operate in a second mode corresponding to discontinuation of coordinated audio output.

12. The system of claim 11, wherein the at least one memory further comprises instructions that, when executed by the at least one processor, further cause the system to:
determine second data representing a semantic interpretation of the utterance,
wherein the instructions that cause the system to send the first data are based at least in part on the semantic interpretation.

13. The system of claim 11, wherein the at least one memory further comprises instructions that, when executed by the at least one processor, further cause the system to:
prior to receipt of the input audio data, cause coordinated music playback using the first device and the second device; and
after sending the first data, cause further music playback using the first device and not the second device.

14. The system of claim 11, wherein the instructions that cause the system to send the first data are based at least in part on the output data.

15. The system of claim 11, wherein the at least one memory further comprises instructions that, when executed by the at least one processor, further cause the system to:
determine first configuration data corresponding to the first device and the second device belonging to a group corresponding to the coordinated audio output; and
substitute the first configuration data with second configuration data corresponding to removal of the first device from the group.

16. The system of claim 11, wherein the at least one memory further comprises instructions that, when executed by the at least one processor, further cause the system to:
after sending the first data, cause the first device to present the output data; and
after presentation of the output data, send second data causing the first device to resume the first mode corresponding to coordinated audio output with the second device.

17. The system of claim 11, wherein the at least one memory further comprises instructions that, when executed by the at least one processor, further cause the system to:
based at least in part on the speech processing, send second data causing the first device to lower an output volume setting.

18. The system of claim 11, wherein the at least one memory further comprises instructions that, when executed by the at least one processor, further cause the system to:
determine user preference data corresponding to the utterance,
wherein the instructions that cause the system to send the first data are further based at least in part on the user preference data.

19. The system of claim 11, wherein the at least one memory further comprises instructions that, when executed by the at least one processor, further cause the system to:
receive sensor data corresponding to an environment of the utterance,
wherein the instructions that cause the system to send the first data are further based at least in part on the sensor data.

20. The system of claim 11, wherein the at least one memory further comprises instructions that, when executed by the at least one processor, further cause the system to:
based at least in part on the input audio data, send second data causing at least one of the first device or the second device to operate in a do not disturb mode.

* * * * *